US011924875B2

(12) United States Patent
Wang et al.

(10) Patent No.: US 11,924,875 B2
(45) Date of Patent: Mar. 5, 2024

(54) TRANSMISSION IN UNLICENSED FREQUENCY SPECTRUM

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 17/429,177

(22) PCT Filed: Feb. 7, 2020

(86) PCT No.: PCT/EP2020/053196
§ 371 (c)(1),
(2) Date: Aug. 6, 2021

(87) PCT Pub. No.: WO2020/161332
PCT Pub. Date: Aug. 13, 2020

(65) Prior Publication Data
US 2022/0095374 A1    Mar. 24, 2022

(30) Foreign Application Priority Data

Feb. 8, 2019  (WO) ................ PCT/CN2019/074739

(51) Int. Cl.
*H04W 74/08*   (2009.01)
*H04L 1/08*    (2006.01)
*H04W 16/14*   (2009.01)

(52) U.S. Cl.
CPC .......... *H04W 74/0808* (2013.01); *H04L 1/08* (2013.01); *H04W 16/14* (2013.01)

(58) Field of Classification Search
CPC ...... H04W 74/0808; H04W 16/14; H04L 1/08
(Continued)

(56) References Cited

U.S. PATENT DOCUMENTS

2010/0322291 A1* 12/2010 Kaikkonen .......... H04B 1/7083
                                                           375/147
2017/0063498 A1*  3/2017 Venkatsuresh .......... H04L 69/16
2018/0279168 A1*  9/2018 Jheng ..................... H04L 5/001

OTHER PUBLICATIONS

InterDigital Communications, "Packet Duplication at PDCP", 3GPP TSG-RAN WG2 Meeting #97, R2-1701186, Athens, Greece, Feb. 13-17, 2017, pp. 1-2.

(Continued)

*Primary Examiner* — Nghi H Ly
(74) *Attorney, Agent, or Firm* — Murphy, Bilak & Homiller, PLLC

(57) ABSTRACT

A transmitter (12) obtains data packets at a higher layer (16A) of a protocol stack (16), and duplicates each data packet at the higher layer (16A) to obtain duplicates of each data packet. The duplicates are transmitted on different respective channels from the higher layer (16A) to a lower layer (16B) of the protocol stack (16). The transmitter (12) generates different transport blocks to include data from the different respective channels, such that the duplicates of each data packet are conveyed by different transport blocks. For each transport block, the transmitter (12) transmits or does not transmit at least a part of the transport block within at least a part of a different respective transmission opportunity on a link (26) to a receiver (14) using unlicensed frequency spectrum (28), depending on whether or not a channel sensing procedure indicates the unlicensed frequency spectrum (28) is clear during that at least part of the transmission opportunity.

18 Claims, 18 Drawing Sheets

(58) Field of Classification Search
USPC .......................... 370/329, 328, 338, 341, 350
See application file for complete search history.

(56) References Cited

OTHER PUBLICATIONS

Zte, "Considerations on PDCP duplication and routing for NR-U", 3GPP TSG RAN WG2 NR #104 Meeting, R2-1816840, Revision of R2-1813746, Spokane, US, Nov. 12-16, 2018, 1-2.

* cited by examiner

TRANSMISSION IN UNLICENSED FREQUENCY SPECTRUM

TECHNICAL FIELD

The present application relates generally to transmission in unlicensed frequency spectrum, and relates more particularly to the transmission of a partial transport block in unlicensed frequency spectrum.

BACKGROUND

Before a transmitter is allowed to transmit within a transmission opportunity (e.g., slot) in unlicensed frequency spectrum, the transmitter must determine that the spectrum is clear during that transmission opportunity, e.g., based on a channel sensing procedure. If the spectrum becomes clear only after the start of the transmission opportunity, this means that only a part of the transmission opportunity will remain available for the transmission. In order to not waste that partial transmission opportunity, the transmitter may nonetheless transmit a part of the transmission (e.g., by puncturing the block of modulated symbols to be transmitted) scheduled for that transmission opportunity. However, this may jeopardize the receiver's ability to successfully decode the transmission.

The transmission may of course be retransmitted if the receiver fails to decode the partial transmission. But such retransmission increases transmission latency and threatens compliance with quality of service requirements, especially for high priority transmissions with low latency requirements.

SUMMARY

Some embodiments herein duplicate a higher layer packet (e.g., a Packet Data Convergence Protocol, PDCP, packet) and convey the duplicates using different transport blocks (e.g., Medium Access Control, MAC, Protocol Data Units, PDUs). One or more embodiments in this regard may transmit the duplicates on different channels (e.g., logical channels or radio bearers) to a lower layer, with the different channels time multiplexed such that the duplicates are conveyed in different transmission opportunities. As availability of unlicensed frequency spectrum may vary from transmission opportunity to transmission opportunity, and even within a given transmission opportunity, these embodiments may proactively hedge against the spectrum being unavailable during all or a portion of a transmission opportunity. Some embodiments thereby advantageously increase the chances that at least one of the duplicates will be conveyed (in full) during at least one of the transmission opportunities. This may in turn reduce transmission latency and ensure compliance with quality of service requirements. In fact, some embodiments herein selectively apply duplication to higher layer packets that are for services which have certain quality of service requirements (e.g., low latency).

Other embodiments herein alternatively or additionally apply a similar principle to duplicate control information (e.g., L1/L2 control information). That is, in these embodiments, duplicates of the control information are conveyed by different transmission opportunities, e.g., to ensure that the control information will be successfully decoded in at least one of those opportunities.

Alternatively or additionally, still other embodiments herein puncture a block of modulation symbols, starting from an end of the block (rather than a beginning of the block). This way, control/header information conveyed by the modulation symbols at the beginning of the block are not punctured, thereby increasing the chances that the receiver will be able to successfully decode the block. In some embodiments, the receiver may transmit control signalling to the transmitter, indicating the puncturing pattern to be used.

More particularly, embodiments herein include a method performed by a transmitter configured for use in a wireless communication system. The method comprises obtaining data packets at a higher layer of a protocol stack implemented by the transmitter. The method also comprises duplicating each data packet at the higher layer to obtain duplicates of each data packet. The method may further include transmitting the duplicates of each data packet on different respective channels from the higher layer to a lower layer of the protocol stack. The method also comprises generating different transport blocks to include data from the different respective channels, such that the duplicates of each data packet are conveyed by different transport blocks. The method then comprises, for each transport block, transmitting or not transmitting at least a part of the transport block within at least a part of a different respective transmission opportunity on a link to a receiver using unlicensed frequency spectrum, depending on whether or not a channel sensing procedure indicates the unlicensed frequency spectrum is clear during that at least part of the transmission opportunity.

In some embodiments, the method further comprises determining whether one or more conditions are met for duplicating the data packets at the higher layer. In this case, duplicating comprises selectively duplicating the data packets at the higher layer depending on whether or not the one or more conditions are met. In some of these embodiments, the one or more conditions include the data packets conveying data for, or originating from, a certain service, a certain type of service, or a service requiring at least a certain latency requirement. Alternatively or additionally, in some embodiments, the one or more conditions include a metric exceeding a threshold, where the metric indicates or depends on a load or occupancy of the link. Alternatively or additionally, in some embodiments, the one or more conditions include a channel sensing failure metric exceeding a failure threshold, where the channel sensing failure metric indicates or depends on a number of times the channel sensing procedure has failed on the link within a defined time duration.

In some embodiments, said transmitting or not transmitting comprises, for each transport block, transmitting or not transmitting at least a part of the transport block also depending on whether or not a previously transmitted transport block has already conveyed a duplicate of the same data packet as that conveyed by the transport block.

In some embodiments, the method further comprises receiving from the receiver control signaling indicating whether the transmitter is or is not to duplicate the data packets at the higher layer. In this case, said duplicating may comprise selectively duplicating the data packets at the higher layer depending on whether the control signaling indicates the transmitter is or is not to duplicate the data packets.

In some embodiments, the method further comprises receiving from the receiver control signaling indicating a minimum time interval required between transmission of transport blocks conveying duplicates of the same data packet, and configuring generation of transport blocks and/ or timing with which transport blocks are transmitted according to the received control signaling.

In some embodiments, the method further comprises receiving from the receiver control signaling indicating a number of duplicates of each data packet that the higher layer at the transmitter is to obtain, and said duplicating comprises duplicating each data packet at the higher layer to obtain the number of duplicates each data packet indicated by the received control signaling.

In some embodiments, the data packets are packet data convergence protocol, PDCP, packets, the higher layer is a PDCP layer, the lower layer is a radio link control, RLC, layer, the channels are logical channels, and the transport blocks correspond to medium access control, MAC, protocol data units, PDUs.

In some embodiments, the wireless communication system is a New Radio Unlicensed, NR-U, system.

In some embodiments, the link is or corresponds to a single cell, carrier, beam, bandwidth part, channel or sub-band.

Embodiments herein also include a method performed by a receiver configured for use in a wireless communication system. The method comprises transmitting, from the receiver to a transmitter, control signaling indicating one or more of: whether the transmitter is or is not to duplicate data packets at a higher layer to be conveyed by different transport blocks within different respective transmission opportunities on a link to the receiver using unlicensed frequency spectrum; a number of duplicates of each data packet that the higher layer at the transmitter is to obtain; and a minimum time interval required between transmission of transport blocks conveying duplicates of the same data packet.

In some embodiments, the control signaling indicates whether the transmitter is or is not to duplicate data packets at the higher layer.

In some embodiments, the control signaling indicates the number of duplicates of each data packet that the higher layer at the transmitter is to obtain.

In some embodiments, the control signaling indicates the minimum time interval.

In some embodiments, the method further comprises determining a load or occupancy metric that indicates or depends on a load or occupancy of the link; and generating the control signaling to indicate the transmitter is to duplicate data packets based on the load or occupancy metric exceeding a threshold.

In some embodiments, the method further comprises determining a channel sensing failure metric that indicates or depends on a number of times a channel sensing procedure has failed on the link within a defined time duration. The method may also comprise generating the control signaling to indicate the transmitter is to duplicate data packets based on the channel sensing failure metric exceeding a failure threshold.

In some embodiments, the data packets are packet data convergence protocol, PDCP, packets, the higher layer is a PDCP layer, and the transport blocks correspond to medium access control, MAC, protocol data units, PDUs.

In some embodiments, the wireless communication system is a New Radio Unlicensed, NR-U, system.

In some embodiments, the link is or corresponds to a single cell, carrier, beam, bandwidth part, channel or sub-band.

Embodiments herein also include corresponding apparatus, computer programs, and carriers such as computer-readable storage mediums. For example, embodiments herein include a transmitter configured for use in a wireless communication system. The transmitter is configured (e.g., via communication circuitry and processing circuitry) to obtain data packets at a higher layer of a protocol stack implemented by the transmitter, and to duplicate each data packet at the higher layer to obtain duplicates of each data packet. The transmitter may also be configured to transmit the duplicates of each data packet on different respective channels from the higher layer to a lower layer of the protocol stack, and to generate different transport blocks to include data from the different respective channels, such that the duplicates of each data packet are conveyed by different transport blocks. The transmitter may further be configured to, for each transport block, transmit or not transmit at least a part of the transport block within at least a part of a different respective transmission opportunity on a link to a receiver using unlicensed frequency spectrum, depending on whether or not a channel sensing procedure indicates the unlicensed frequency spectrum is clear during that at least part of the transmission opportunity.

Embodiments also include a receiver configured for use in a wireless communication system. The receiver is configured (e.g., via communication circuitry and processing circuitry) to transmit, from the receiver to a transmitter, control signaling indicating one or more of: whether the transmitter is or is not to duplicate data packets at a higher layer to be conveyed by different transport blocks within different respective transmission opportunities on a link to the receiver using unlicensed frequency spectrum; a number of duplicates of each data packet that the higher layer at the transmitter is to obtain; and a minimum time interval required between transmission of transport blocks conveying duplicates of the same data packet.

Embodiments herein also include a method performed by a receiver configured for use in a wireless communication system. The method comprises transmitting, from the receiver to a transmitter, dynamic control signaling indicating a number of repetitions of a transport block, if any, that the transmitter is to transmit in consecutive transmission opportunities.

In some embodiments, the dynamic control signaling comprises downlink control information, DCI.

In some embodiments, the method further comprises receiving the repetitions of the transport block on a link in unlicensed frequency spectrum.

In some embodiments, the wireless communication system is a New Radio Unlicensed, NR-U, system.

In some embodiments, the method further comprises determining a load or occupancy metric that indicates or depends on a load or occupancy of a link between the transmitter and the receiver, and generating the dynamic control signaling such that a greater number of repetitions are transmitted as the load or occupancy metric increases.

In some embodiments, the method further comprises determining a channel sensing failure metric that indicates or depends on a number of times a channel sensing procedure has failed on the link within a defined time duration. The method may also comprise generating the dynamic control signaling such that a greater number of repetitions are transmitted as the channel sensing failure metric increases.

Embodiments herein also include a method performed by a transmitter configured for use in a wireless communication system. The method comprises receiving, from a receiver, dynamic control signaling indicating a number of repetitions of a transport block, if any, that the transmitter is to transmit in consecutive transmission opportunities to the receiver.

In some embodiments, the dynamic control signaling comprises downlink control information, DCI.

In some embodiments, the method further comprises transmitting the repetitions of the transport block on a link in unlicensed frequency spectrum.

In some embodiments, the wireless communication system is a New Radio Unlicensed, NR-U, system.

Embodiments herein also include corresponding apparatus, computer programs, and carriers such as computer-readable storage mediums. For example, embodiments include a receiver configured for use in a wireless communication system. The receiver is configured (e.g., via communication circuitry and processing circuitry) to transmit, from the receiver to a transmitter, dynamic control signaling indicating a number of repetitions of a transport block, if any, that the transmitter is to transmit in consecutive transmission opportunities.

Embodiments herein further include a transmitter configured for use in a wireless communication system. The transmitter is configured (e.g., via communication circuitry and processing circuitry) to receive, from a receiver, dynamic control signaling indicating a number of repetitions of a transport block, if any, that the transmitter is to transmit in consecutive transmission opportunities to the receiver.

DETAILED DESCRIPTION

Figure 1:
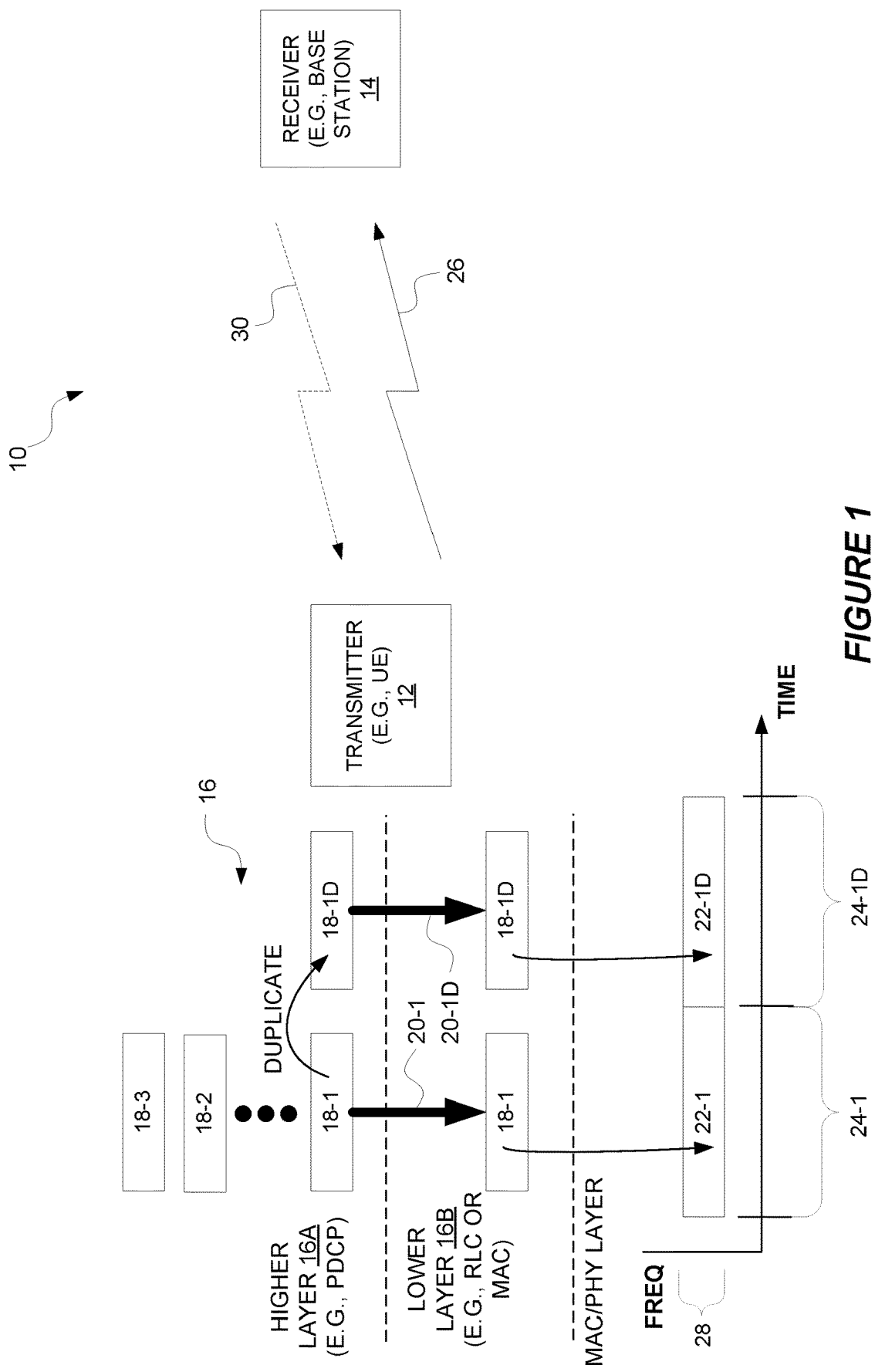
FIG. 1 is a block diagram of a wireless communication system according to some embodiments.

FIG. 1 shows a transmitter 12 and a receiver 14 configured for use in a wireless communication system 10 (e.g., a New Radio Unlicensed, NR-U, system). In some embodiments, the transmitter 12 is a wireless device (e.g., a user equipment) and the receiver 14 is a base station (e.g., a gNB). In other embodiments, the transmitter 12 is a base station and the receiver 14 is a wireless device. In still other embodiments, the transmitter 12 and the receiver 14 are each a wireless device.

The transmitter 12 implements a protocol stack 16 as shown. The protocol stack includes a higher layer 16A (e.g., a Packet Data Convergence Protocol, PDCP, layer), and a lower layer 16B (e.g., a Radio Link Control, RLC, layer, or a Medium Access Control, MAC, layer). The higher layer 16A is higher simply in the sense that it is relatively higher than the lower layer 16B in the protocol stack. As shown, the transmitter 12 obtains data packets 18-1, 18-2, ... 18-3 (e.g., Protocol Data Units, PDUs) at the higher layer 16A. Notably, the transmitter 12 according to some embodiments duplicates each data packet at the higher layer 16A in order to obtain duplicates of each data packet. As shown, for instance, the transmitter 12 duplicates data packet 18-1 in order to obtain duplicates 18-1 and 18-1D of the data packet, where the original data packet 18-1 is considered a "duplicate" here.

The transmitter 12 then transmits the duplicates 18-1 and 18-1D on different respective channels 20-1 and 20-1D to the lower layer 16B. These channels 20-1 and 20-1D in some embodiments may alternatively or additionally be referred to as bearers. Where the higher and lower layers are PDCP and RLC layers, respectively, for example, the channels 20-1 and 20-1D may be referred to as Radio Bearers. Where the lower layer 16B is a Medium Access Control (MAC) layer, with zero or more layers between the lower layer 16B and the higher layer 16B, the channels 20-1 and 20-1D may be referred to as Logical Channels (LCHs).

Regardless, the transmitter 12 (e.g., at the MAC layer if the lower layer 16B is the RLC layer) generates different transport blocks 22-1 and 22-1D to include the data from the different respective channels 20-1 and 20-1D, e.g., such that the duplicates 18-1 and 18-1D are conveyed by different respective transport blocks 22-1 and 22-1D. That is, the duplicates 18-1 and 18-1D are included in the payload of the different respective transport blocks 22-1 and 22-1D. In one or more embodiments, the transmitter 12 accomplishes this by time multiplexing the channels 20-1 and 20-1D such that data from the channels are mapped into different transport blocks 22-1 and 22-1D. In some embodiments, the transport blocks 22-1 and 22-1D may correspond to different MAC PDUs.

The transmitter 12 then, for each of the transport blocks 22-1 and 22-1D, transmits or does not transmit at least a part of that transport block within at least a part of a different respective transmission opportunity 24-1 and 24-1D (e.g., time slots) on a link 26 to the receiver 14 using unlicensed frequency spectrum 28, depending on whether or not a channel sensing procedure (e.g., a Listen-Before-Talk, LBT, procedure) indicates the unlicensed frequency spectrum 28 is clear during that at least part of the transmission opportunity. If the transmitter 12 transmits only part of a transport block within a part of a transmission opportunity, the transmitter 12 in some embodiments may puncture part of the transport block, e.g., as needed for the transport block to fit within the available part of the transmission opportunity.

In one example, for instance, the transmitter 12 does not transmit transport block 22-1 within any part of transmission opportunity 24-1, since the channel sensing procedure indicates the unlicensed frequency spectrum 28 is not clear during any part of that transmission opportunity 24-1. But the transmitter 12 does transmit transport block 22-1D within at least part of transmission opportunity 24-1D, since the channel sensing procedure indicates the unlicensed frequency spectrum 28 is clear during at least that part of the transmission opportunity 24-1D. In this case, then, data from duplicate 18-1D may proactively be conveyed by transport block 22-1D, despite the failure of data from duplicate 18-1 being conveyed by transport block 22-1 since that transport block 22-1 is never transmitted. This means that the receiver 14 may be able to successfully receive duplicate 18-1D despite not receiving duplicate 18-1.

In another example, the transmitter 12 transmits only part of transport block 22-1 within part of the transmission opportunity 24-1, since the channel sensing procedure only indicates that the unlicensed frequency spectrum 28 is clear after the start of the transmission opportunity 24-1. But the transmitter 12 transmits all of transport block 22-1D within transmission opportunity 24-1, since the channel sensing procedure indicates that the unlicensed frequency spectrum 28 is clear as of the start of the transmission opportunity 24-1, e.g., because the transmitter 24-1 has already occupied the spectrum itself. In this case, then, even if the receiver 14 cannot successfully decode transport block 22-1 (since only part of it is received), the receiver 14 may be able to successfully decode transport block 22-1D (since all of it is received). This means that the receiver 14 may be able to successfully receive duplicate 18-1D despite not successfully receiving duplicate 18-1. And, since the transmitter 12 proactively conveyed duplicate 18-1D without waiting for negative acknowledgement feedback from the receiver 14, the receiver 14 successfully receives duplicate 18-1D with lower latency than that which would have otherwise resulted from re-transmission prompted by negative acknowledgement feedback.

As these examples demonstrate, then, in some embodiments herein the transmitter 12 duplicates a higher layer packet (e.g., PDCP packet) and conveys the duplicates 18-1, 18-1D using different transport blocks 22-1, 22-1D (e.g., MAC PDUs). One or more embodiments in this regard may transmit the duplicates 18-1, 18-1D on different channels 20-1, 20-1D (e.g., logical channels or radio bearers) to the lower layer 16B, with the different channels time multiplexed such that the duplicates are conveyed in different transmission opportunities 24-1, 24-1D on the same link 26. As availability of unlicensed frequency spectrum 28 may vary from transmission opportunity to transmission opportunity, and even within a given transmission opportunity, these embodiments may proactively hedge against the spectrum 28 being unavailable during all or a portion of a transmission opportunity. Some embodiments thereby advantageously increase the chances that at least one of the duplicates 18-1, 18-1D will be conveyed (in full) during at least one of the transmission opportunities. This may in turn reduce transmission latency and ensure compliance with quality of service requirements. In fact, some embodiments herein selectively apply duplication to higher layer packets that are for services which have certain quality of service requirements (e.g., low latency).

More generally in this regard, in some embodiments, the transmitter 12 determines whether one or more conditions are met for duplicating the data packets at the higher layer. The transmitter 12 then selectively duplicates the data packets at the higher layer depending on whether or not the one or more conditions are met. In some embodiments, the one or more conditions include the data packets conveying data for, or originating from, a certain service, a certain type of service, or a service requiring at least a certain latency requirement. Alternatively or additionally, the one or more conditions include a metric exceeding a threshold, wherein the metric indicates or depends on a load or occupancy of the link. Alternatively or additionally, the one or more conditions include a channel sensing failure metric exceeding a failure threshold, wherein the channel sensing failure metric indicates or depends on a number of times the channel sensing procedure has failed on the link within a defined time duration.

In still other embodiments, the transmitter 12 is configured to receive control signalling 30 from the receiver 14. In some embodiments, the control signalling 30 indicates whether the transmitter 12 is or is not to duplicate the data packets at the higher layer 16A. In this case, then, the transmitter 12 may selectively duplicate the data packets at the higher layer depending on whether the control signaling 30 indicates the transmitter 12 is or is not to duplicate the data packets. Alternatively or additionally, the control signaling 30 may indicate a minimum time interval required between transmission of transport blocks 22-1, 22-1D conveying duplicates of the same data packet. That is, although shown in FIG. 1 as being consecutive, the transmission opportunities 24-1, 24-1D within which the transport blocks 22-1, 22-1D are transmitted may be required to be separated by at least this minimum time interval. This minimum time interval may be set as needed to strike a balance between a shorter interval which would reduce latency and a longer interval which would better ensure the unlicensed frequency spectrum's availability in at least one of the transmission opportunities. Alternatively or additionally, the control signaling 30 may indicate a number of duplicates of each data packet that the higher layer at the transmitter is to obtain. In this case, the transmitter 12 may duplicate each data packet at the higher layer to obtain the number of duplicates each data packet indicated by the received control signaling 30.

Figure 2:
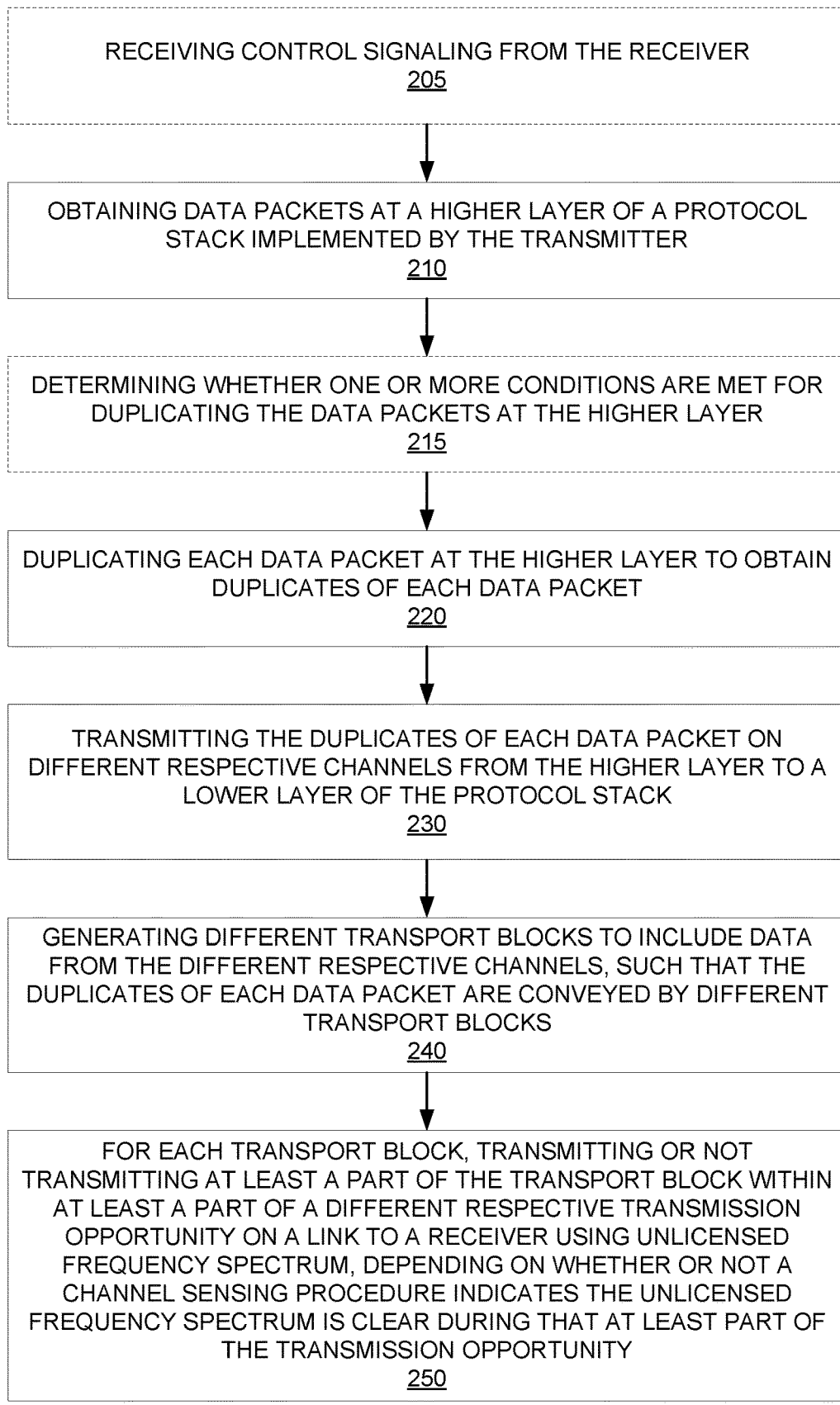
FIG. 2 is a logic flow diagram of a method performed by a transmitter according to some embodiments.

In view of the above modifications and variations, FIG. 2 depicts a method performed by a transmitter 12 configured for use in a wireless communication system 10 in accordance with particular embodiments. The method may include obtaining data packets at a higher layer 16A of a protocol stack 16 implemented by the transmitter 12 (Block 210). The method may also include duplicating each data packet at the higher layer 16A to obtain duplicates of each data packet (Block 220). The method may further include transmitting the duplicates of each data packet on different respective channels from the higher layer 16A to a lower layer 16B of the protocol stack 16 (Block 230). The method may also include generating different transport blocks to include data from the different respective channels, such that the duplicates of each data packet are conveyed by different transport blocks (Block 240). The method in some embodiments may also include, for each transport block, transmitting or not transmitting at least a part of the transport block within at least a part of a different respective transmission opportunity on a link 26 to a receiver 14 using unlicensed frequency spectrum 28, depending on whether or not a channel sensing procedure indicates the unlicensed frequency spectrum 28 is clear during that at least part of the transmission opportunity (Block 250).

In some embodiments, the method includes determining whether one or more conditions are met for duplicating the data packets at the higher layer 16A (Block 215). In this case, said duplicating may comprise selectively duplicating the data packets at the higher layer 16A depending on whether or not the one or more conditions are met.

In some embodiments, the method may include receiving from the receiver 14 control signaling 30 (Block 205). The control signaling 30 in some embodiments may indicate whether the transmitter 12 is or is not to duplicate the data packets at the higher layer 16A. Alternatively or additionally, the control signaling j30 may indicate a minimum time interval required between transmission of transport blocks conveying duplicates of the same data packet. Alternatively or additionally, the control signaling 30 may indicate a number of duplicates of each data packet that the higher layer 16A at the transmitter 12 is to obtain.

Figure 3:
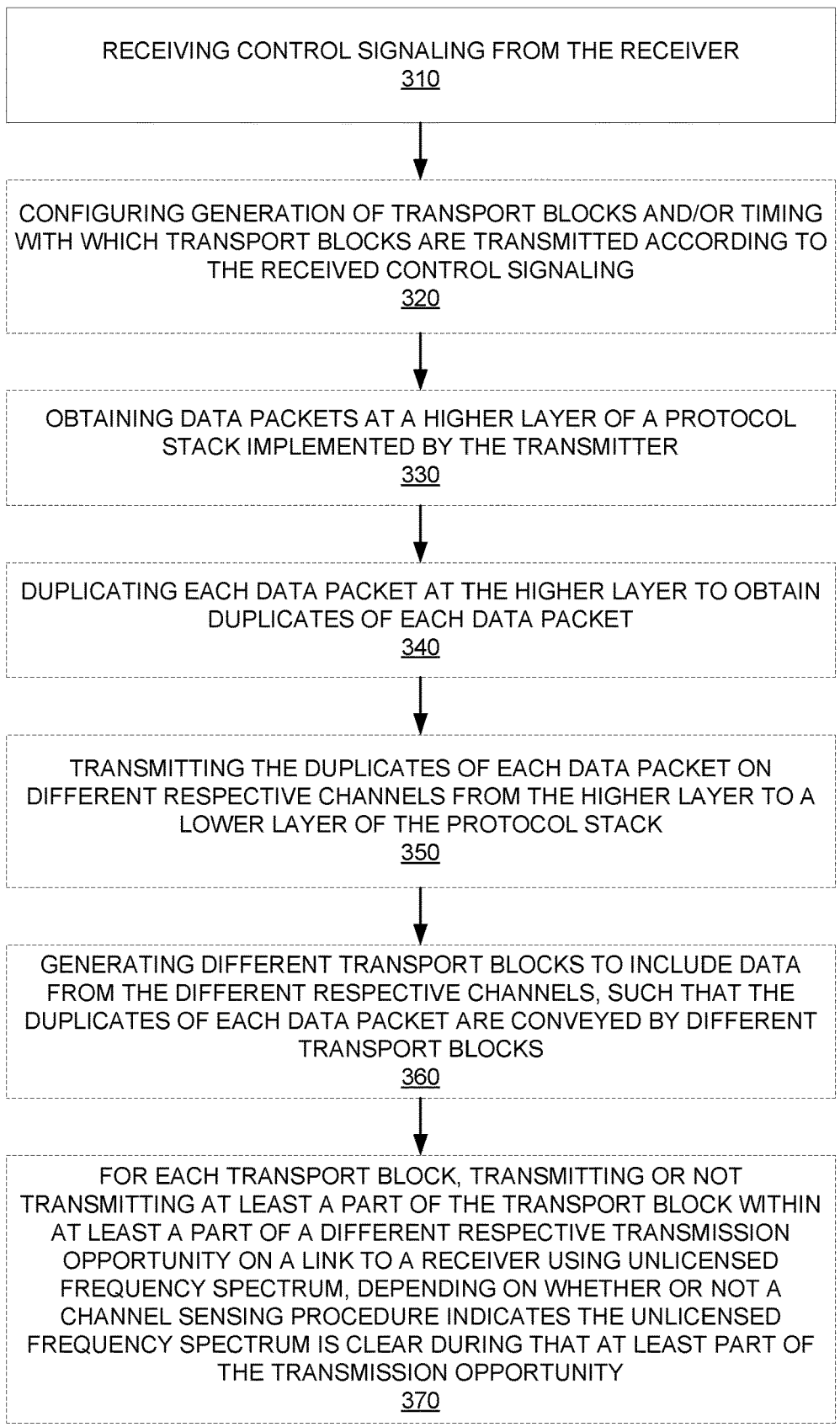
FIG. 3 is a logic flow diagram of a method performed by a transmitter according to other embodiments.

FIG. 3 depicts a method performed by a transmitter 12 configured for use in a wireless communication system 10 in accordance with other particular embodiments. The method may include receiving control signaling 30 from a receiver 14 (Block 310). The control signaling 30 in some embodiments may indicate whether the transmitter 12 is or is not to duplicate the data packets at the higher layer 16A. Alternatively or additionally, the control signaling 30 may indicate a minimum time interval required between transmission of transport blocks conveying duplicates of the same data packet. Alternatively or additionally, the control signaling 30 may indicate a number of duplicates of each data packet that the higher layer 16A at the transmitter 12 is to obtain.

In some embodiments, the method may also include configuring generation of transport blocks and/or timing with which transport blocks are transmitted according to the received control signaling 30 (Block 320).

The method may include obtaining data packets at a higher layer 16A of a protocol stack 16 implemented by the transmitter 12 (Block 330). The method may also include duplicating each data packet at the higher layer 16A to obtain duplicates of each data packet (Block 340). The method may further include transmitting the duplicates of each data packet on different respective channels from the higher layer 16A to a lower layer 16B of the protocol stack 16 (Block 350). The method may also include generating different transport blocks to include data from the different respective channels, such that the duplicates of each data packet are conveyed by different transport blocks (Block 360). The method in some embodiments may also include, for each transport block, transmitting or not transmitting at least a part of the transport block within at least a part of a different respective transmission opportunity on a link 26 to a receiver 14 using unlicensed frequency spectrum, depending on whether or not a channel sensing procedure indicates the unlicensed frequency spectrum 28 is clear during that at least part of the transmission opportunity (Block 370).

Figure 4:
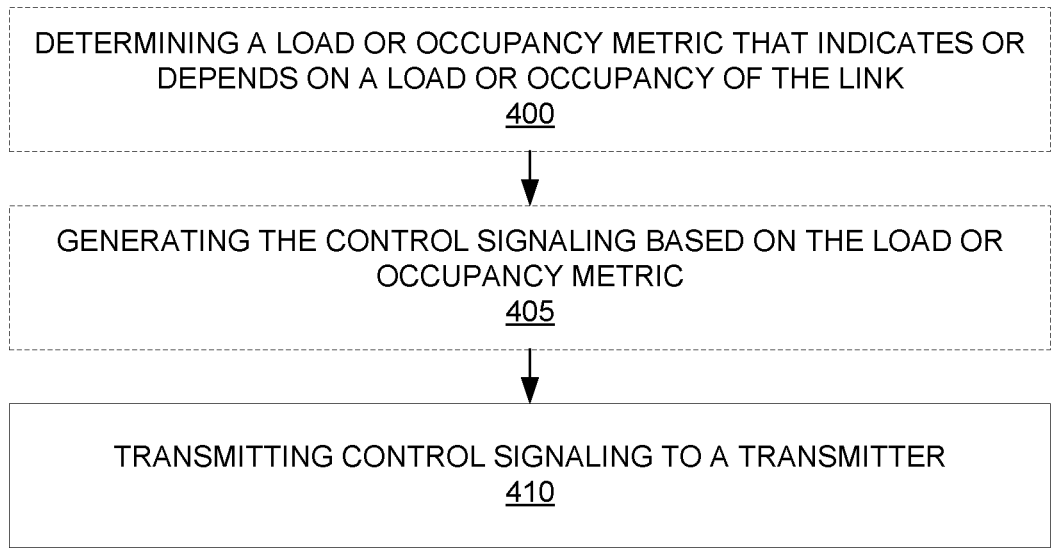
FIG. 4 is a logic flow diagram of a method performed by a receiver according to some embodiments.

FIG. 4 depicts a method performed by a receiver 14 configured for use in a wireless communication system 10 in accordance with other particular embodiments. The method may include transmitting control signaling 30 to a transmitter 12 (Block 410). The control signaling 30 in some embodiments may indicate whether the transmitter 12 is or is not to duplicate the data packets at the higher layer 16A. Alternatively or additionally, the control signaling 30 may indicate a minimum time interval required between transmission of transport blocks conveying duplicates of the same data packet. Alternatively or additionally, the control signaling 30 may indicate a number of duplicates of each data packet that the higher layer 16A at the transmitter 12 is to obtain.

The method in some embodiments may further include determining a load or occupancy metric that indicates or depends on a load or occupancy of the link (Block 400). In this case, the method may also include generating the control signaling 30 based on the load or occupancy metric (Block 405).

Other embodiments herein alternatively or additionally apply a similar principle to duplicate control information (e.g., L1/L2 control information). That is, in these embodiments, duplicates of the control information are conveyed by different transmission opportunities, e.g., to ensure that the control information will be successfully decoded in at least one of those opportunities.

Alternatively or additionally, still other embodiments herein puncture a block of modulation symbols, starting from an end of the block (rather than a beginning of the block). This way, control/header information conveyed by the modulation symbols at the beginning of the block are not punctured, thereby increasing the chances that the receiver will be able to successfully decode the block. In some embodiments, the receiver 14 may transmit control signaling 30 to the transmitter 12, indicating the puncturing pattern to be used.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
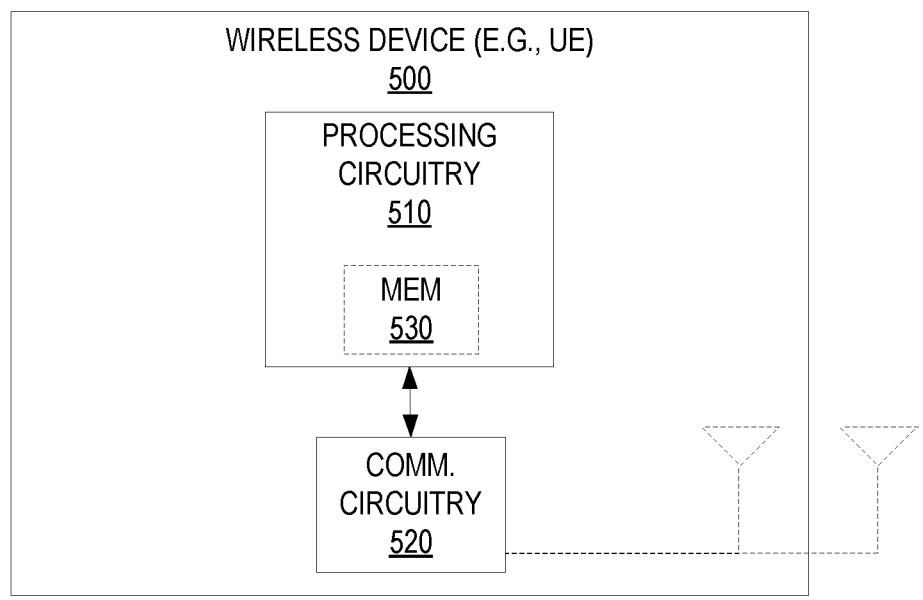
FIG. 5 is a block diagram of a wireless device according to some embodiments.

FIG. 5 for example illustrates a wireless device 500 (e.g., receiver 12 or transmitter 14) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, such as by executing instructions stored in memory 530. The processing circuitry 510 in this regard may implement certain functional means, units, or modules.

Figure 6:
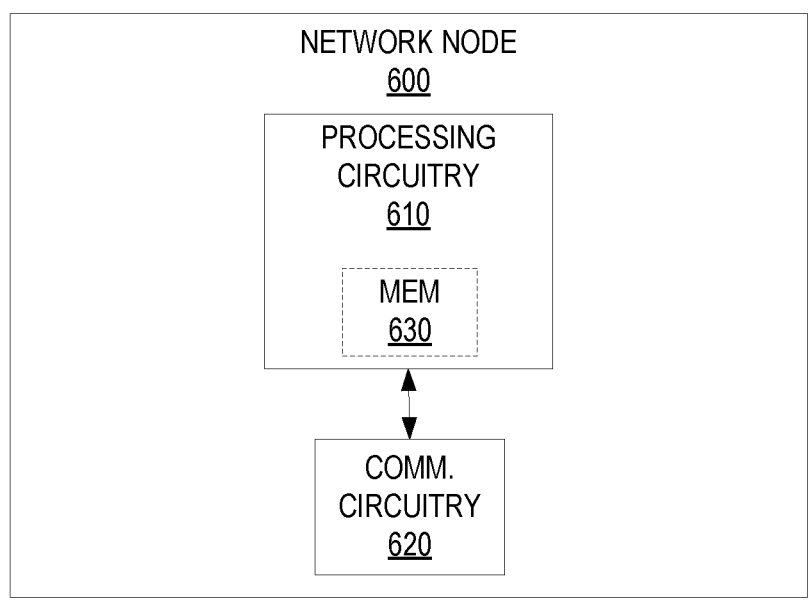
FIG. 6 is a block diagram of a network node according to some embodiments.

FIG. 6 illustrates a network node 600 (e.g., receiver 12 or transmitter 14) as implemented in accordance with one or more embodiments. As shown, the network node 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types (e.g., NR-U) for illustrative purposes, but the embodiments are similarly applicable in other contexts and/or wireless network types not explicitly described.

Next generation systems are expected to support a wide range of use cases with varying requirements ranging from fully mobile devices to stationary Internet-of-Things (IoT) or fixed wireless broadband devices. The traffic pattern associated with many use cases is expected to consist of short or long bursts of data traffic with varying length of waiting period in between (here called inactive state). In New Radio (NR), both license-assisted access and standalone unlicensed operation are to be supported in 3GPP. Hence the procedure of Physical Random Access Channel (PRACH) transmission and/or Scheduling Request (SR) transmission in unlicensed spectrum shall be investigated in 3GPP. In the following, NR Unlicensed (NR-U) and channel access procedure for a unlicensed channel based on Listen Before Talk (LBT) is introduced.
NR-U Introduction In order to tackle with the ever increasing data demand, NR is considered for both licensed and unlicensed spectrum. NR-U needs to support dual connectivity (DC) and standalone scenarios, where the Medium Access Control (MAC) procedures including the Random Access Channel (RACH) and scheduling procedure on unlicensed spectrum are subject to the LBT failures. There was no such restriction in Long Term Evolution (LTE) Licensed-Assisted Access (LAA), since there was licensed spectrum in the LAA scenario so the RACH and scheduling related signaling can be transmitted on the licensed spectrum instead of unlicensed spectrum.

For NR-U, channel sensing should be applied to determine that the channel available before a physical signal is transmitted using the channel. This is the case for discovery reference signal (DRS) transmission such as Primary Synchronization Signal (PSS), Secondary Synchronization Signal (SSS), Physical Broadcast Channel (PBCH), and Channel State Information Reference Signal (CSI-RS), control channel transmission such as Physical Uplink Control Channel (PUCCH) and Physical Downlink Control Channel (PDCCH), physical data channel such as Physical Uplink Shared Channel (PUSCH) and Physical Downlink Shared Channel (PDSCH), and uplink sounding reference signal (SRS) such as SRS transmission.

The radio resource management (RRM) procedures in NR-U would be generally rather similar as in LAA, since NR-U is aiming to reuse LAA/eLAA/feLAA technologies as much as possible to handle the coexistence between NR-U and other legacy radio access technologies (RATs). Radio Resource Management (RRM) measurements and reporting have a special configuration procedure with respect to the channel sensing and channel availability.

Hence, channel access/selection for LAA was one of the important aspects for co-existence with other RATs such as Wi-Fi. For instance, LAA has aimed to use carriers that are congested with Wi-Fi.

In licensed spectrum, a user equipment (UE) measures Reference Signal Received Power (RSRP), and Reference Signal Received Quality (RSRQ) of the downlink radio channel, and provides the measurement reports to its serving eNB/gNB. However, they don't reflect the interference strength on the carrier. Another metric Received Signal Strength Indicator (RSSI) can serve for such purpose. At the eNB/gNB side, it is possible to derive RSSI based on the received RSRP and RSRQ reports. However, this requires that they must be available. Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long UEs have made the measurements can assist the gNB/eNB to detect the hidden node. Additionally, the gNB/eNB can measure the load situation of the carrier which is useful for the network to prioritize some channels for load balance and channel access failure avoidance purposes.

LTE LAA has defined to support measurements of averaged RSSI and channel occupancy for measurement reports. The channel occupancy is defined as the percentage of time that RSSI was measured above a configured threshold. For this purpose, an RSSI measurement timing configuration (RMTC) includes a measurement duration (e.g. 1-5 ms) and a period between measurements (e.g. {40, 80, 160, 320, 640} ms).
Channel Access Procedure in NR Unlicensed Spectrum Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before its next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For quality of service (QoS) differentiation, a channel access priority based on the service type has been defined. For example, four LBT priority classes are defined for differentiation of contention window sizes (CWS) and MCOT between services.

Partial PUSCH Transmission

Figure 7:
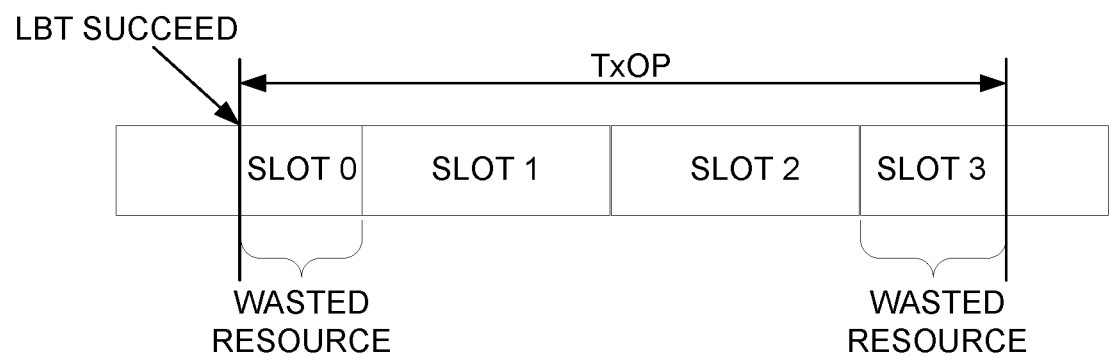
FIG. 7 is a block diagram of a transmission opportunity in which resources are wasted due to success of a Listen Before Talk procedure occurring in the middle of a slot.

LBT operation time positions may not be aligned with the NR slot boundaries. In many cases the LBT process may succeed within a slot. In the existing LTE or NR licensed system, the transmission opportunity (TxOP) starting positions are limited to slot boundaries. This could result in significant wastage of the TxOP resources as shown in FIG. 7.

Similar problems were identified in LTE LAA/eLAA where the first allocation in the TxOP was allowed to start at symbol 7 instead of symbol 0 always. Similarly, the last slot was allowed to be with multiple sizes since the end of the TxOP may not align with a slot boundary.

NR unlicensed is expected to inherit such a design with certain enhancements. For instance, multiple starting locations for the first slot and multiple ending locations for the last slot will allow partial PUSCH transmission, in order to secure the channel and reduce the resource wastage due to slot boundary alignment. This option is referred to herein as Option 1.

There may be two issues for Option 1, i.e., with multiple start positions in the first slot. Issue 1: with support of multiple start positions in the first slot of a TxOP, the UE is required to puncture the first part of the PUSCH transmission to align with the instant that UL LBT is successful, which would result in that the UE cannot decode any code block based on the received partial PUSCH and MAC Protocol Data Unit (PDU) decoding can only be performed when the missed PUSCH part is received. Issue 2: in order to detect the UE's Demodulation Reference Signal (DMRS) transmission for partial PUSCH transmissions, the network must configure additional DMRS positions within the slot at the cost of the DMRS overhead increase and demodulation complexity.

Another option (referred to as Option 2) is to support both slot and mini-slot based scheduling plus using wider subcarrier spacing (SCS) to reduce the slot duration, so that an NR transmitter can have more opportunities to contend for and secure an unlicensed channel. NR Rel-15 has already supported such functionalities. However, support of smaller slots and/or using larger SCS comes with additional power consumption since the UE may have to monitor PDCCH more often than ordinary.

There currently exist certain challenge(s). For Option 1, a UE may have a possibility to either lose a TxOP if there is no available start position left in the slot when the LBT operation is successful, or the gNB cannot correctly decode the received transport block due to that some necessary part for decoding has been punctured.

For Option 2, a UE has a possibility to lose one or several TxOPs with mini-slots durations, or due to a huge power consumption for PDCCH monitoring, the UE may not be able to monitor PDCCH more often than ordinary so that the UE may miss the scheduling opportunities for services with critical QoS requirements. Some prepared MAC PDU according to a mini slot format may be not transmitted as well if the channel is not available.

As described above, in case that a UE has missed one or several TxOPs or the gNB has failed to decode the received data, the corresponding transport block cannot be received so the UE has to wait for a new grant to transmit the corresponding data. In order to handle this situation, it is expected that the UE may have two options to transmit the data that has failed:

Option 1: the MAC PDU that fails to be transmitted in the radio interface is treated in the same way as that for an ordinary transmission failure. In this case, the UE relies on reception of a new grant (without the New Data Indicator, NDI, togged) to trigger a retransmission for this transport block (TB).

Option 2: the transport block that fails to be transmitted may be dropped and the corresponding hybrid automatic repeat request (HARQ) process is released. In this case, the upper layer triggers retransmission at the Radio Link Control (RLC) layer or the Packet Data Convergence Protocol (PDCP) layer via certain cross layer interaction. The upper layer such as RLC would trigger a corresponding retransmission immediately when a MAC PDU fails to be transmitted in the radio interface.

Option 2 here is preferred especially when the UE is expected to achieve better multiplexing gain, since the transport block that is missed to transmit may have been scheduled in a mini-slot scheduling pattern. Whenever the channel is obtained, the UE may switch back to the slot-based scheduling pattern to reduce the signaling overhead due to PDCCH signaling.

No matter which option is used, though, according to the existing resource allocation policy and multiplexing policy for MAC Control Element (CE) and logical channels, high priority information such as data for high priority logical channel, MAC CE and RRC signaling, are included in the MAC PDUs transmitted using ahead PUSCHs. If these MAC PDUs fail to be transmitted due to channel unavailability and RLC/HARQ retransmission is triggered, the transmission latency for high priority information will be increased and the latency target of these high priority information will not be fulfilled.

For any of the above issues, the quality of service (QoS) of services with critical requirements may be degraded.

Certain aspects of the present disclosure and their embodiments may provide solutions to these or other challenges. Some embodiments include methods to reduce the latency for critical user plane (UP) data due to missed transmission opportunities in case the device experiences LBT failures. Some embodiments include one or more of:

1) Dynamic triggering and application of PDCP duplication for a UE with single serving cell/bandwidth part (BWP)/channel/subband;
2) Dynamic triggering and application of PUSCH repetition function;
3) Enhanced puncture for partial PUSCH transmission to improve decoding of partial MAC PDU;
4) Improved MAC CE mapping in a MAC PDU for PUSCH so that the MAC CE can be decoded based on partial MAC PDU.

Certain embodiments may provide one or more of the following technical advantage(s). With the proposed mechanisms, an NR-U UE is able to reduce the latency and improve the transmission reliability for services with critical QoS requirements. Alternatively or additionally, with the proposed mechanisms the code blocks comprised in a partial transmitted MAC PDU are decodable.

Some embodiments are described in more detail below. The below embodiments are described in the context of NR unlicensed spectrum (NR-U), but they are not limited to NR-U scenarios. They are also applicable to other unlicensed operation scenarios such as LTE LAA/eLAA/feLAA.

A first embodiment herein introduces a mechanism to provide duplicated PDCP PDUs for a service, logical channel (LCH), MAC CE, or RRC signaling of a UE to overcome potential LBT failures in case the UE is experiencing high channel occupancy or occurrence of high number of LBT failures in a cell, carrier, BWP, channel, or sub-band. Compared to the existing PDCP duplication mechanism in NR licensed, the mechanism includes one or more of the following:

1) The duplication mechanism may be for a UE in a single BWP/channel/sub-band where the UE has only one single connection to the network available.
2) The duplication mechanism is to guard against the potential LBT failures, so that each duplicate of the PDCP PDU is transmitted in a separated MAC PDU which is suitable for a single transmission opportunity.
3) The interval between two consecutive duplicates of the same PDCP PDU can be configured or tuned by the gNB in some embodiments, depending on measured channel occupancy and/or LBT statistics.
4) The duplication mechanism introduces new signaling aspects.

According to the first embodiment, in an unlicensed cell/BWP/channel/subband, if there is high channel occupancy or the occurrence of high number of LBT failures, a service or LCH of a UE can be configured with a PDCP duplication function. As a result, one or more than one new logical channels are additionally configured for this service/LCH for duplication purpose.

Some embodiments allow for configurability of least two parameters regarding duplication configuration, namely for example:

1) duplication-deepth indicating the number of duplicates for the same PDCP PDU, controlling the reliability degree that the transmission can achieve.
2) duplicate-interval indicating the interval between two consecutive duplicates. In some embodiments, it can be set in the time unit of ms or the number of OFDM symbols, or the number of consecutive mini-slots etc.

Figure 8:
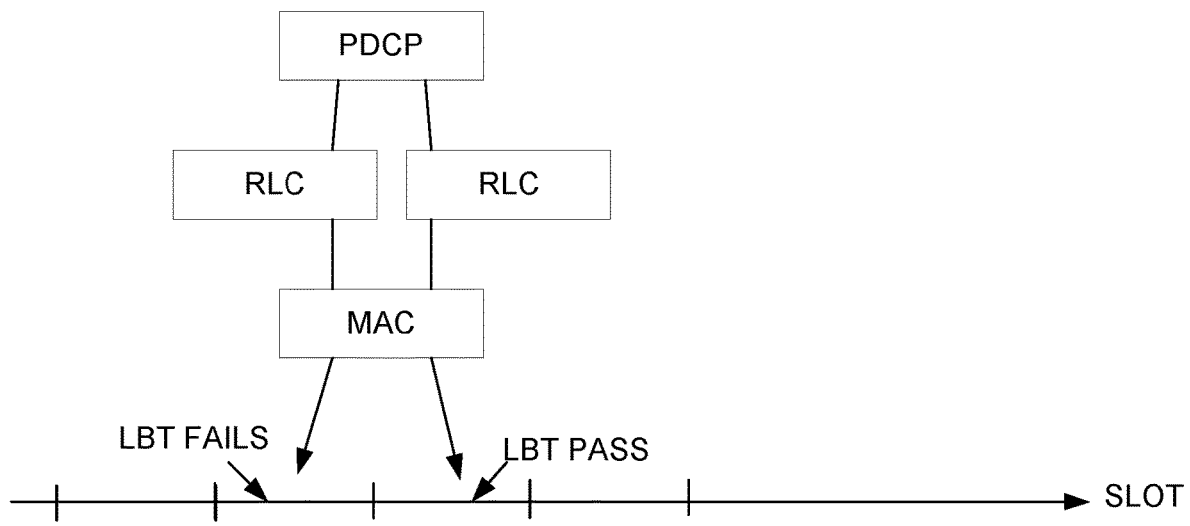
FIG. 8 is a block diagram of Packet Data Convergence Protocol (PDCP) duplication according to some embodiments.

FIG. 8 shows an example of duplication where two PDCP duplicates are created (duplication-deepth=2, duplicate-interval=0). The first duplicate is subject to the LBT failure, while the second duplicate gets through since LBT has passed.

Consider one example to clarify how the proposed mechanism works. In an example, there is a LCH1 associated with a service with a critical latency requirement, such as URLLC. The duplication function is enabled or activated in case high channel occupancy or a high number of LBT failures are detected in a serving cell/BWP/channel/subband where the LCH1 is mapped to transmit. In this case, the gNB can configure/add one additional LCH named as LCHx to carry duplicated data of LCH1. The LCHx and LCH1 may be configured with the same LCH priority.

In this example, in order to make sure that not more than one duplicate of the same PDCP PDU are included in the same transport block, the logical channel prioritization procedure may be updated such that LCH1 and LCHx are not to be multiplexed in the same MAC PDU/transport block. In this way, the PDCP duplicates of the same PDCP PDU will not be transmitted in the same MAC PDU. So, if one duplicate is subject to LBT failures, other duplicates have the possibility to get thorough in other TxOPs (for example, in subsequent TxOPs).

In some embodiments, the UE may be configured to remove redundant duplicates in case at least one duplicate has won the channel to transmit.

In a further embodiment, a gNB can activate/deactivate such duplication using a cell/UE specific PDCCH order, a MAC CE, or RRC signaling. For instance, when the traffic load is high in the cell, the gNB can deactivate PDCP/RLC duplication using a MAC CE.

Figure 9:
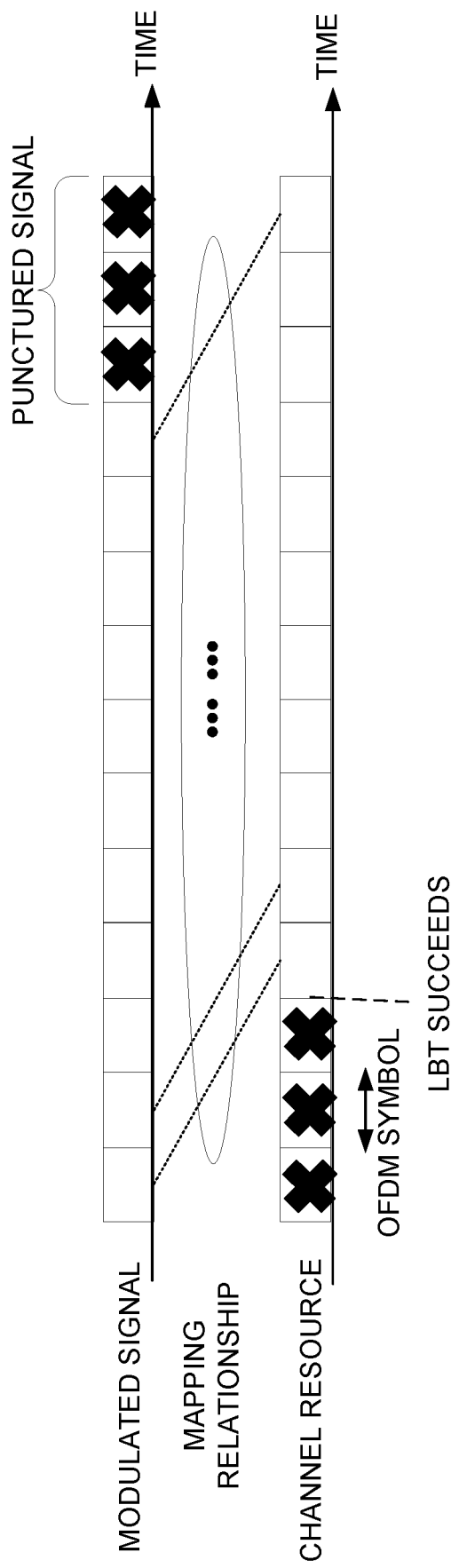
FIG. 9 is a block diagram of puncturing from the end of a partial Physical Uplink Shared Channel (PUSCH) transmission according to some embodiments.

In a second embodiment, the MAC PDU is punctured from the end instead of from the start of the transport block. More particularly, when an LBT succeeds in the middle of a slot, a partial PUSCH is transmitted, which means modulation symbols which map on the start symbols of PUSCH are discarded. Absent this second embodiment, the MAC subheader of the first SDU in the MAC PDU would be discarded, which would result in that the receiver 14 may not be able to parse any code block from the received partial MAC PDU. To avoid this, the second embodiment punctures from the end, e.g., when the start symbols for PUSCH transmission are not available. For instance, when symbol 0~x-1 are not available, the symbol 14-x~13 are punctured, and the rest of the modulation symbols are placed in the rest of the OFDM symbols in a slot according to the order in time. FIG. 9 shows an example on how to puncture from the end for partial PUSCH transmission, wherein the modulated signals for the last 3 symbols are punctured when the channel in the first 3 symbols is not available.

In a further embodiment, the MAC CE (or for high priority MAC CE such as regular/periodic BSR, PHR), which is placed behind data SDU in the MAC PDU for PUSCH according to 3GPP TS 38.321 v15.3.0, can be placed ahead of data SDU in the MAC PDU, so that the MAC CE is not punctured when the end symbols in the PUSCH are punctured.

In a third embodiment, when the PUSCH also carries uplink control information (UCI) (e.g. HARQ A/N and/or CSI), the UCI information may be duplicate multiplexed in PUSCHs for multiple slots.

As a fourth embodiment, the existing PUSCH repetition function can be triggered by criteria such as (1) measured channel occupancy has reached a configured threshold, and/or (2) measured number of LBT failures has reached a configured threshold. This may improve the transmission loss due to LBT failures. In the existing NR licensed spec, the parameter pusch-AggregationFactor in PUSCH-Config provides the number of transmissions of a TB within a bundle of the dynamic grant, while the parameter repK in ConfiguredGrantConfig provides the number of transmissions of a TB within a bundle of the configured grant. In this embodiment, one or both parameters can be configured/applied in a more dynamic fashion, not as like in NR licensed, where both parameters operate in a semi-static fashion. In this embodiment, both parameters are configured/applied depending on measured channel occupancy or LBT statistics.

In more detail, PUSCH repetition can be enabled when there is high channel occupancy or occurrence of high number of LBT failures, meaning that the UE may be often subject to LBT failures. In this case, the UE can repeat the TB across the pusch-AggregationFactor or repK consecutive slots, so that the UE has a higher probability to have at least one TB to win the channel for transmission. In another example, the PUSCH repetition can be disabled when there is low channel occupancy or a high ratio of LBT successful operations.

When transmitting PUSCH scheduled by PDCCH with cyclic redundancy check (CRC) scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.

As a fifth embodiment, for any of the above embodiments, the proposed function can be configured per service/LCH/LCG/channel access priority class (CAPC), so that the function may be only applicable to services with critical QoS requirements. The configuration may be signaled via system information, dedicated RRC signaling, a MAC CE or downlink control information (DCI).

Figure 10:
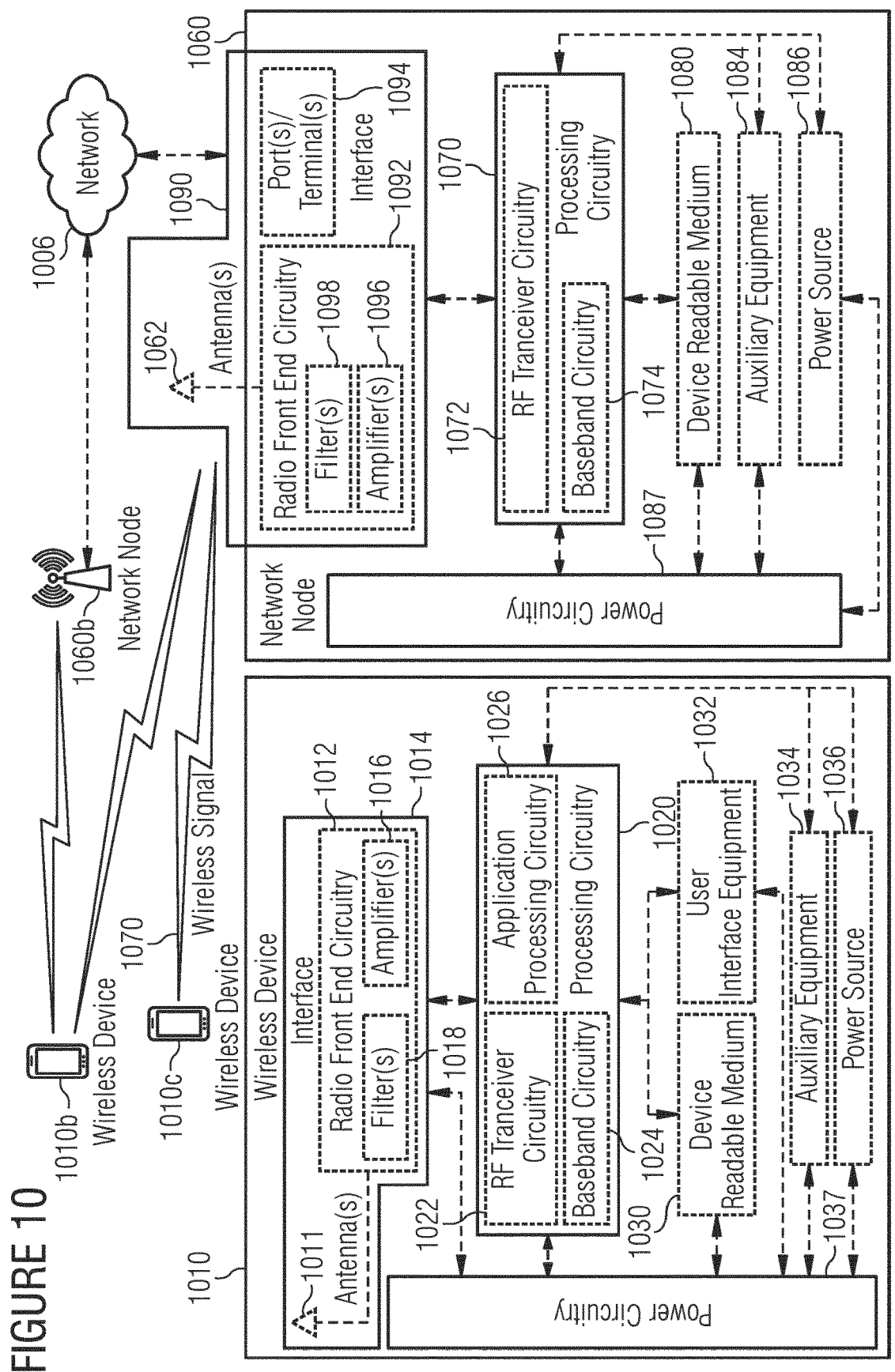
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MM Es), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
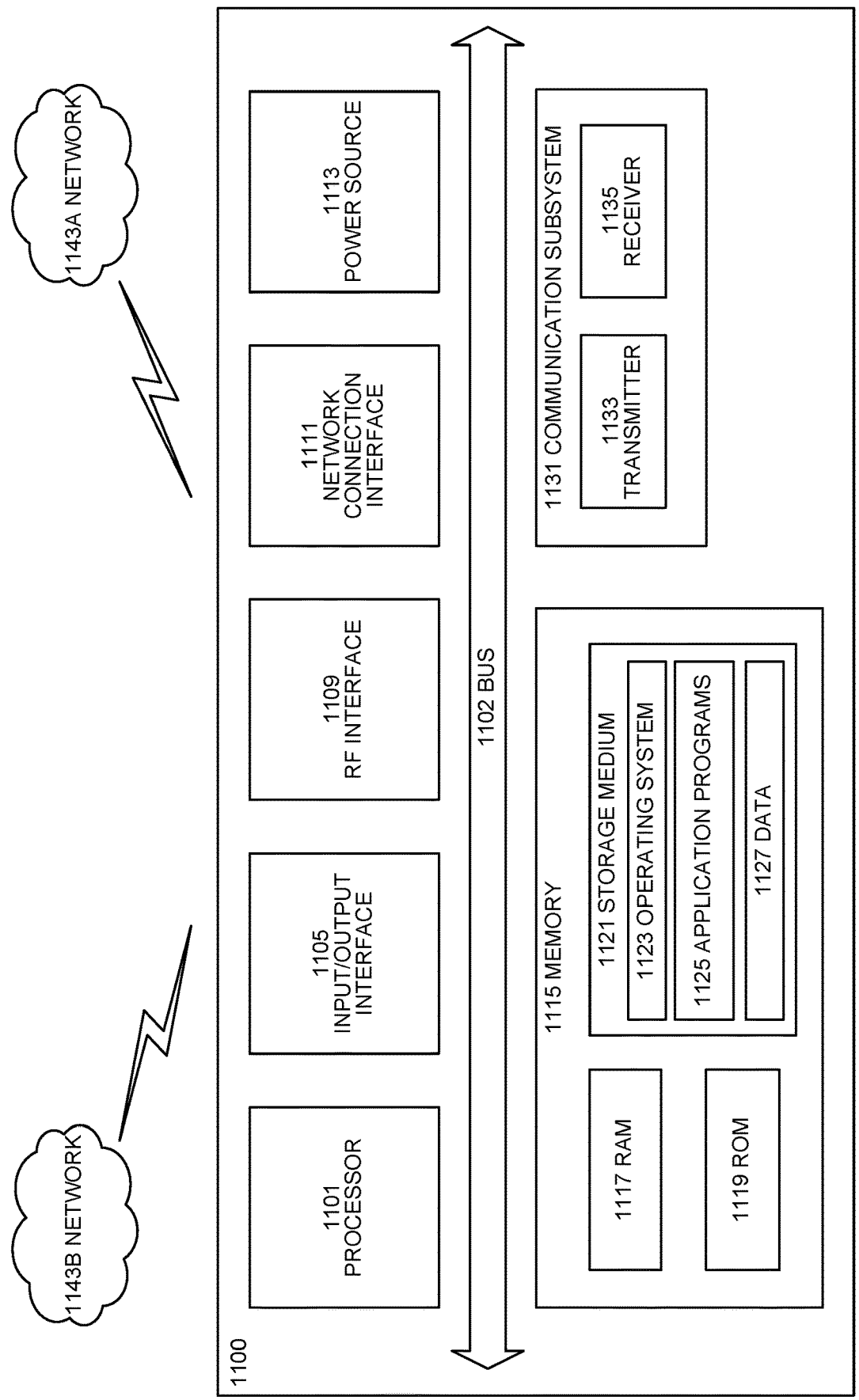
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
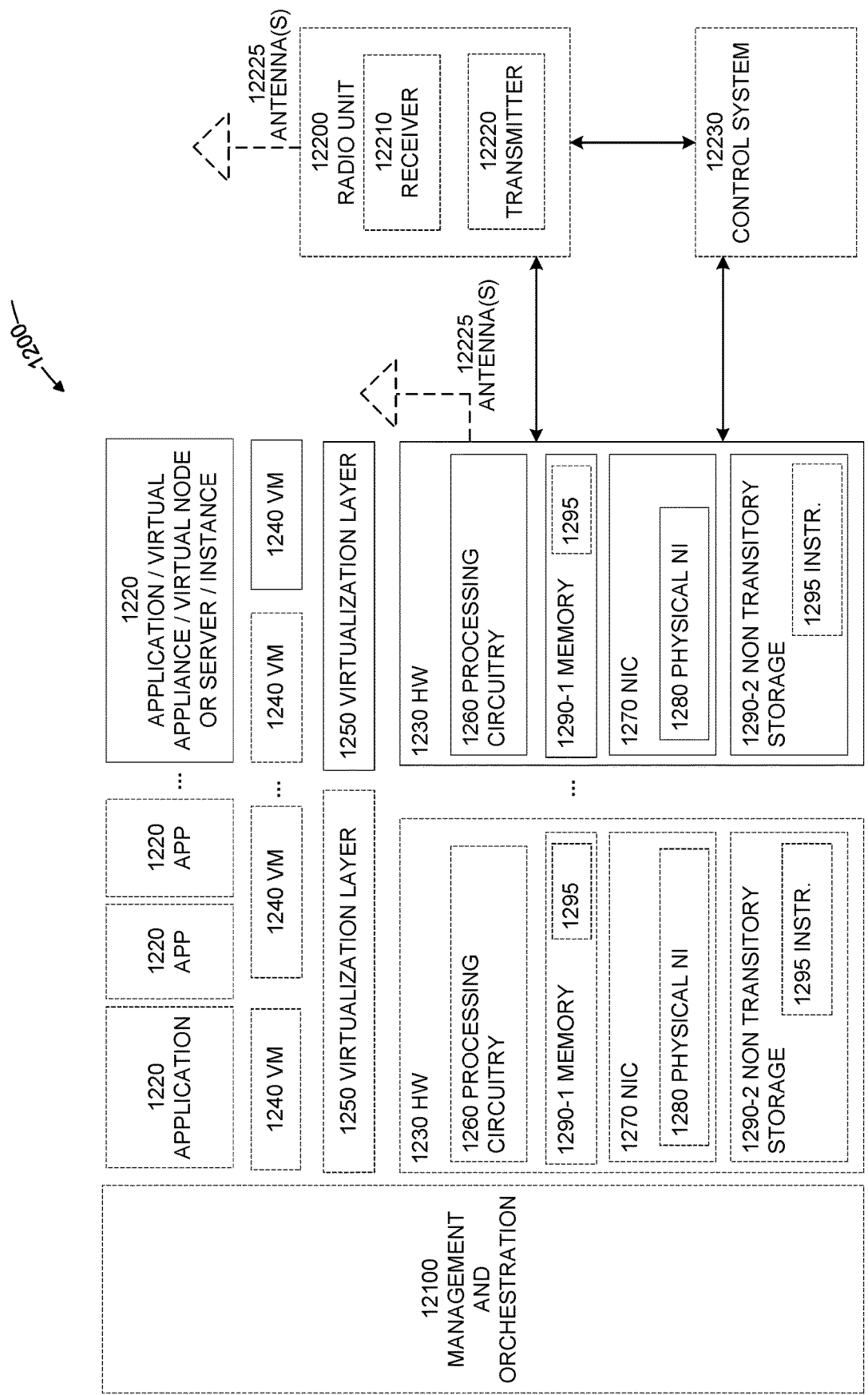
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
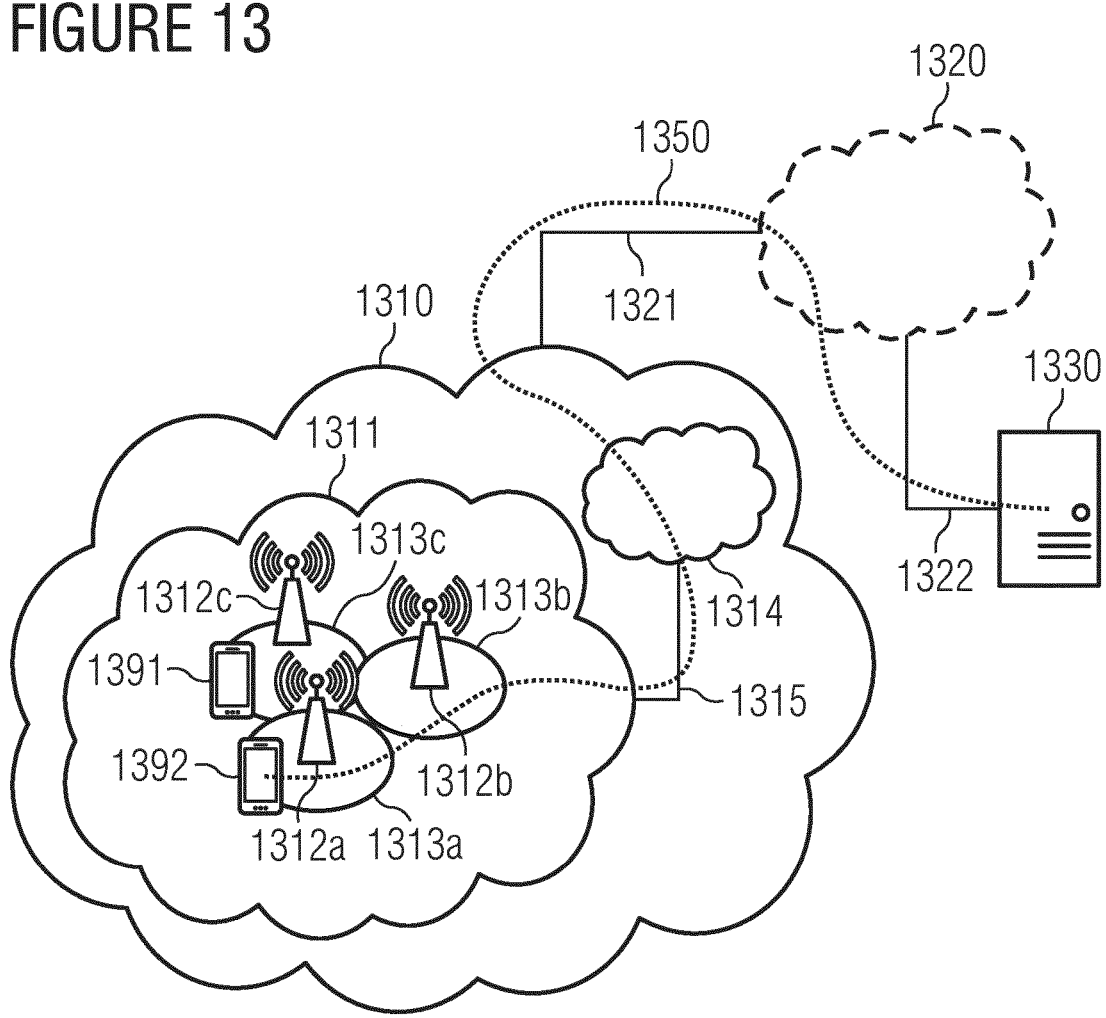
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
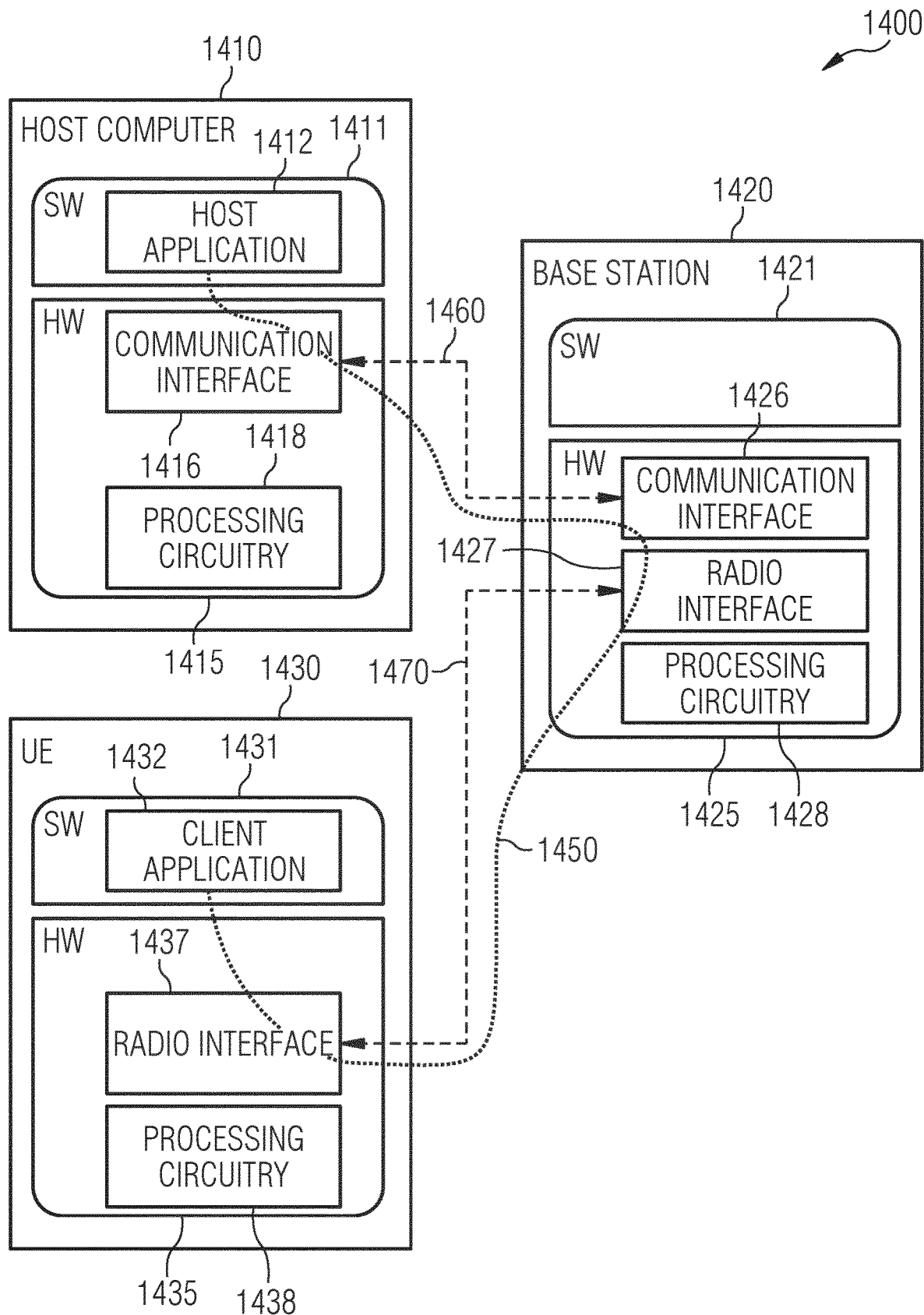
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of U Es 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data latency and transmission reliability and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
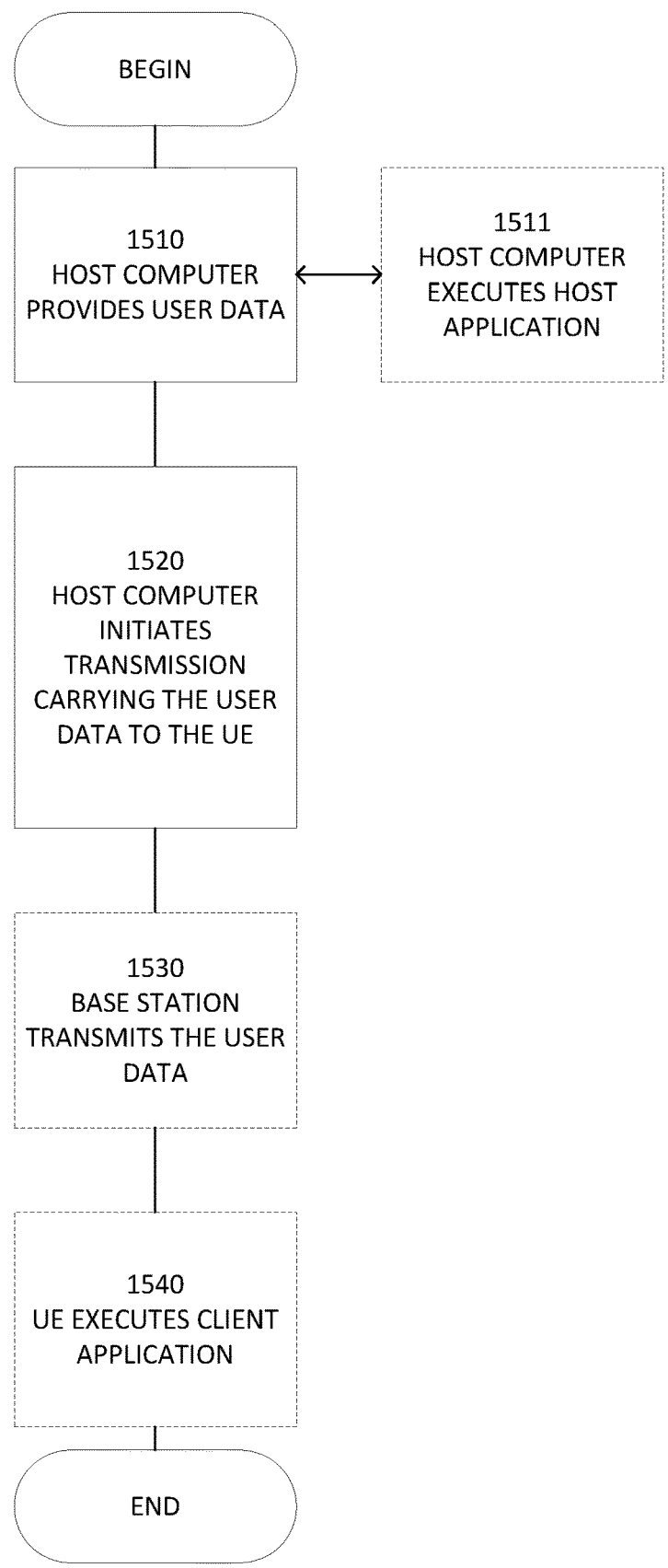
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
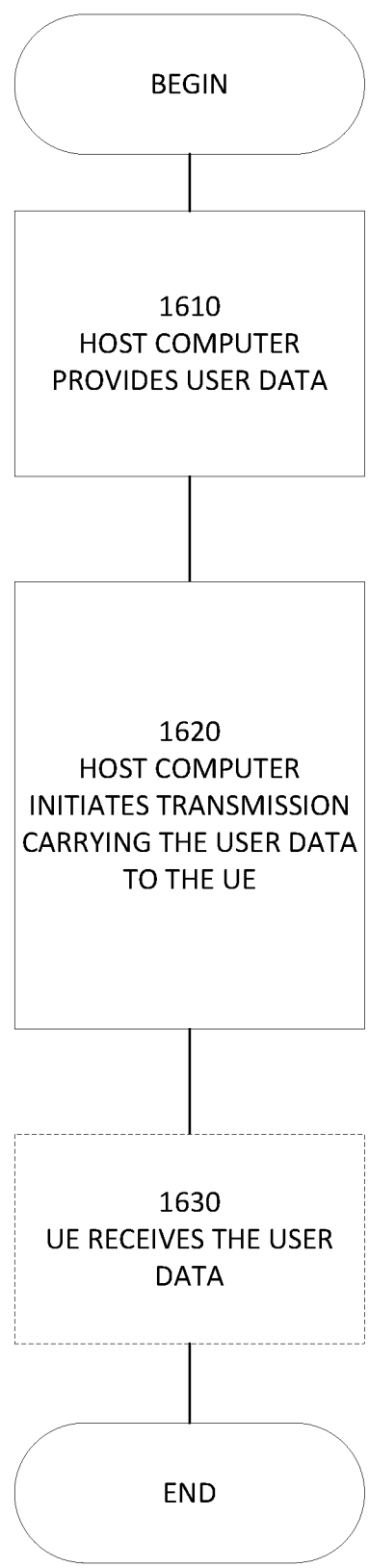
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
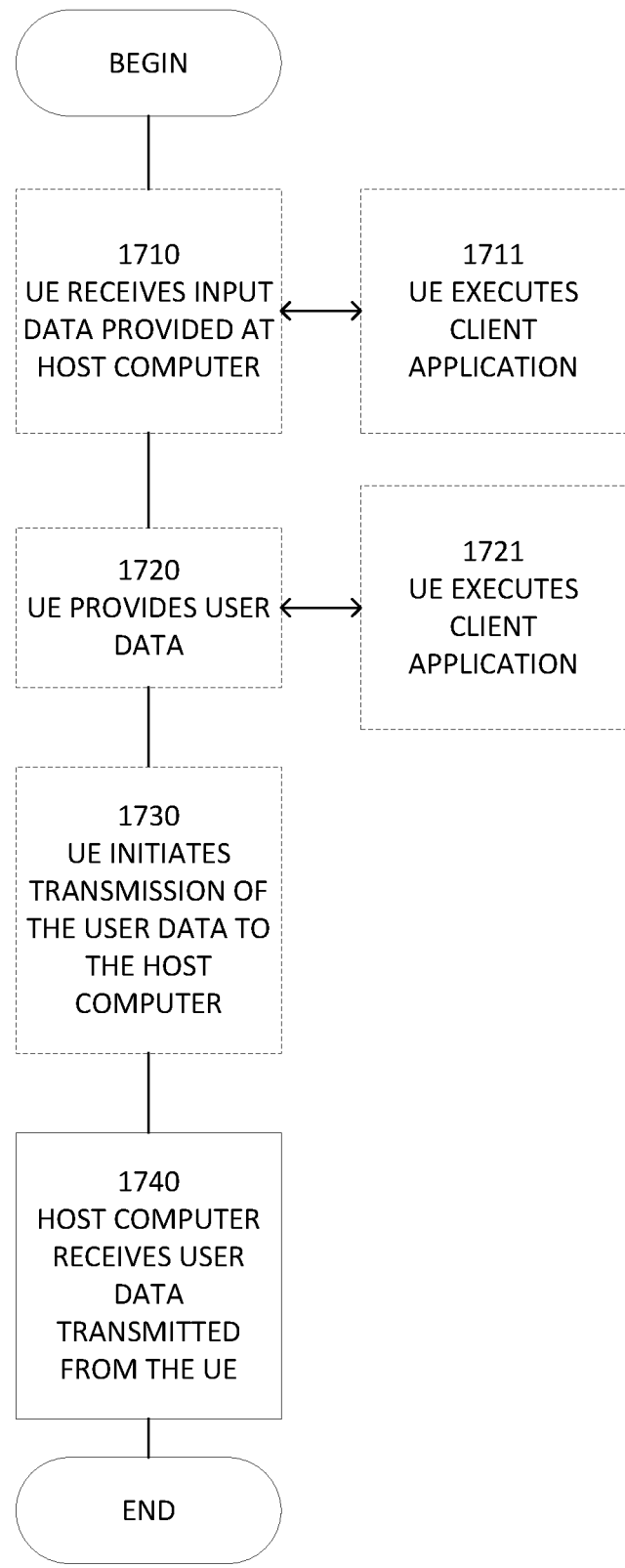
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
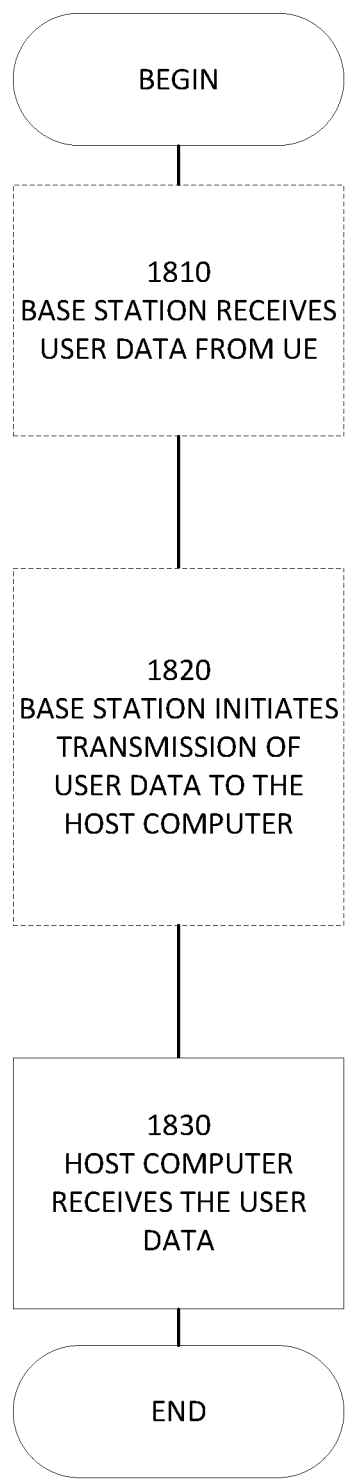
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

GROUP A EMBODIMENTS

A1. A method performed by a transmitter configured for use in a wireless communication system, the method comprising:
  obtaining data packets at a higher layer of a protocol stack implemented by the transmitter;
  duplicating each data packet at the higher layer to obtain duplicates of each data packet;
  transmitting the duplicates of each data packet on different respective channels from the higher layer to a lower layer of the protocol stack;
  generating different transport blocks to include data from the different respective channels, such that the duplicates of each data packet are conveyed by different transport blocks; and
  for each transport block, transmitting or not transmitting at least a part of the transport block within at least a part of a different respective transmission opportunity on a link to a receiver using unlicensed frequency spectrum, depending on whether or not a channel sensing procedure indicates the unlicensed frequency spectrum is clear during that at least part of the transmission opportunity.

A2. The method of embodiment A1, further comprising determining whether one or more conditions are met for duplicating the data packets at the higher layer, and wherein said duplicating comprises selectively duplicating the data packets at the higher layer depending on whether or not the one or more conditions are met.

A3. The method of embodiment A2, wherein the one or more conditions include the data packets conveying data for, or originating from, a certain service, a certain type of service, or a service requiring at least a certain latency requirement.

A4. The method of any of embodiments A2-A3, wherein the one or more conditions include a metric exceeding a threshold, wherein the metric indicates or depends on a load or occupancy of the link.

A5. The method of any of embodiments A2-A4, wherein the one or more conditions include a channel sensing failure metric exceeding a failure threshold, wherein the channel sensing failure metric indicates or depends on a number of times the channel sensing procedure has failed on the link within a defined time duration.

A6. The method of any of embodiments A1-A5 wherein said transmitting or not transmitting comprises, for each transport block, transmitting or not transmitting at least a part of the transport block also depending on whether or not a previously transmitted transport block has already conveyed a duplicate of the same data packet as that conveyed by the transport block.

A7. The method any of embodiments A1-A6, further comprising receiving from the receiver control signaling indicating whether the transmitter is or is not to duplicate the data packets at the higher layer, and wherein said duplicating comprises selectively duplicating the data packets at the higher layer depending on whether the control signaling indicates the transmitter is or is not to duplicate the data packets.

A8. The method any of embodiments A1-A7, further comprising:
  receiving from the receiver control signaling indicating a minimum time interval required between transmission of transport blocks conveying duplicates of the same data packet; and
  configuring generation of transport blocks and/or timing with which transport blocks are transmitted according to the received control signaling.

A9. The method of any of embodiments A1-A8, further comprising receiving from the receiver control signaling indicating a number of duplicates of each data packet that the higher layer at the transmitter is to obtain, and wherein said duplicating comprises duplicating each data packet at the higher layer to obtain the number of duplicates each data packet indicated by the received control signaling.

A10. A method performed by a transmitter configured for use in a wireless communication system, the method comprising:
  receiving, from a receiver, control signaling indicating one or more of:
    whether the transmitter is or is not to duplicate data packets at a higher layer (to be conveyed by different transport blocks within different respective transmission opportunities on a link to the receiver using unlicensed frequency spectrum);
    a number of duplicates of each data packet that the higher layer at the transmitter is to obtain; and
    a minimum time interval required between transmission of transport blocks conveying duplicates of the same data packet.

A11. The method of embodiment A10, wherein the control signaling indicates whether the transmitter is or is not to duplicate data packets at the higher layer.

A12. The method of embodiment A11, further comprising selectively duplicating the data packets at the higher layer depending on whether the control signaling indicates the transmitter is or is not to duplicate the data packets.

A13. The method of any of embodiments A10-A12, wherein the control signaling indicates the number of duplicates of each data packet that the higher layer at the transmitter is to obtain.

A14. The method of embodiment A13, further comprising duplicating each data packet at the higher layer to obtain the number of duplicates each data packet indicated by the received control signaling.

A15. The method of any of embodiments A10-A14, wherein the control signaling indicates the minimum time interval.

A16. The method of embodiment A15, further comprising configuring generation of transport blocks and/or timing with which transport blocks are transmitted according to the received control signaling.

A17. The method of any of embodiments A7-A16, wherein the control signaling comprises a physical downlink control channel order, a medium access control (MAC) control element, downlink control channel information, system information, or radio resource control signaling.

A18. The method of any of embodiments A1-A17, wherein the data packets are packet data convergence protocol, PDCP, packets.

A19. The method of any of embodiments A1-A18, wherein the higher layer is a PDCP layer.

A20. The method of any of embodiments A1-A9, wherein the lower layer is a radio link control, RLC, layer.

A21. The method of any of embodiments A1-A9, wherein the channels are logical channels.

A22. The method of any of embodiments A1-A21, wherein the transport blocks correspond to medium access control, MAC, protocol data units, PDUs.

A23. The method of any of embodiments A1-A22, wherein the wireless communication system is a New Radio Unlicensed, NR-U, system.

A24. The method of any of embodiments A1-A23, wherein the transmitter is a wireless device and the receiver is a radio network node.

A25. The method of embodiment A24, wherein the transport blocks are transmitted on a Physical Uplink Shared Channel, PUSCH.

A26. The method of any of embodiments A1-A23, wherein the transmitter is a radio network node and the receiver is a wireless device.

A27. The method of any of embodiments A1-A26, wherein the link is or corresponds to a single cell, carrier, beam, bandwidth part, channel or sub-band.

GROUP B EMBODIMENTS

B1. A method performed by a receiver configured for use in a wireless communication system, the method comprising:
  transmitting, from the receiver to a transmitter, control signaling indicating one or more of:
    whether the transmitter is or is not to duplicate data packets at a higher layer (to be conveyed by different transport blocks within different respective transmission opportunities on a link to the receiver using unlicensed frequency spectrum);
    a number of duplicates of each data packet that the higher layer at the transmitter is to obtain; and
    a minimum time interval required between transmission of transport blocks conveying duplicates of the same data packet.

B2. The method of embodiment B1, wherein the control signaling indicates whether the transmitter is or is not to duplicate data packets at the higher layer.

B3. The method of any of embodiments B1-B2, wherein the control signaling indicates the number of duplicates of each data packet that the higher layer at the transmitter is to obtain.

B4. The method of any of embodiments B1-B3, wherein the control signaling indicates the minimum time interval.

B5. The method of any of embodiments B1-B4, further comprising:
  determining a load or occupancy metric that indicates or depends on a load or occupancy of the link; and
  generating the control signaling based on the load or occupancy metric.

B6. The method of embodiment B5, wherein generating the control signaling comprises generating the control signaling to indicate the transmitter is to duplicate data packets based on the load or occupancy metric exceeding a threshold.

B7. The method of any of embodiments B1-B6, wherein the control signaling comprises a physical downlink control channel order, a medium access control (MAC) control element, downlink control channel information, system information, or radio resource control signaling.

B8. The method of any of embodiments B1-B7, wherein the data packets are packet data convergence protocol, PDCP, packets.

B9. The method of any of embodiments B1-B8, wherein the higher layer is a PDCP layer.

B10. The method of any of embodiments B1-B9, wherein the transport blocks correspond to medium access control, MAC, protocol data units, PDUs.

B11. The method of any of embodiments B1-B10, wherein the wireless communication system is a New Radio Unlicensed, NR-U, system.

B12. The method of any of embodiments B1-B11, wherein the transmitter is a wireless device and the receiver is a radio network node.

B13. The method of any of embodiments B1-B12, wherein the transmitter is a radio network node and the receiver is a wireless device.

B14. The method of any of embodiments B1-B13, wherein the link is or corresponds to a single cell, carrier, beam, bandwidth part, channel or sub-band.

B15. The method of any of embodiments B1-B14, wherein the control signaling is specific for data packets conveying data for, or originating from, a certain service, a certain type of service, or a service requiring at least a certain latency requirement.

GROUP X EMBODIMENTS

X1. A method performed by a transmitter configured for use in a wireless communication system, the method comprising:
  determining, based on a channel sensing procedure performed on unlicensed frequency spectrum, that only a part of a transmission opportunity on a link to a receiver is available for transmission of a block of modulated symbols in the unlicensed frequency spectrum;
  puncturing the block of modulated symbols according to a puncturing pattern, starting from an end of the block;
  mapping a beginning of the block to a beginning of the part of the transmission opportunity that is available;
  mapping a last modulated symbol not punctured in the block to an end of the transmission opportunity; and
  transmitting the punctured block of modulated symbols as mapped to the part of the transmission opportunity on the link that is available.

X2. The method of embodiment X1, wherein the block of modulated symbols conveys a medium access control, MAC, protocol data unit, PDU.

X3. The method of embodiment X2, wherein a MAC subheader for a MAC service data unit, SDU, is at a beginning of the MAC PDU.

X4. The method of embodiment X2, wherein MAC control elements, CEs, occur before MAC SDUs in the MAC PDU, such that padding or a MAC SDU is at an end of the MAC PDU.

X5. The method of any of embodiments X2-X4, wherein the MAC PDU includes a high priority MAC CE.

X6. The method of any of embodiments X2-X4, wherein the MAC PDU conveys a buffer status report, BSR, or a power headroom report, PHR.

X7. The method of any of embodiments X1-X6, wherein the wireless communication system is a New Radio Unlicensed, NR-U, system.

X8. The method of any of embodiments X1-X7, wherein the transmitter is a wireless device and the receiver is a radio network node.

X9. The method of embodiment X8, wherein the transport blocks are transmitted on a Physical Uplink Shared Channel, PUSCH.

X10. The method of any of embodiments X1-X7, wherein the transmitter is a radio network node and the receiver is a wireless device.

X11. The method of any of embodiments X1-X10, wherein the link is or corresponds to a single cell, carrier, beam, bandwidth part, channel or sub-band.

GROUP XX EMBODIMENTS

1. A method performed by a receiver configured for use in a wireless communication system, the method comprising:
   transmitting, to a transmitter, a puncturing pattern according to which the transmitter is to puncture a block of modulated symbols, starting from an end of the block.

XX2. The method of embodiment 1, wherein a last modulated symbol not punctured in the block is to be mapped to an end of a transmission opportunity on a link between the transmitter and the receiver in unlicensed frequency spectrum.

XX3. The method of any of embodiments 1-XX2, wherein the control signaling indicates the puncturing pattern is to be used if the transmitter determines, based on a channel sensing procedure performed on unlicensed frequency spectrum, that only a part of a transmission opportunity on a link to the receiver is available for transmission of the block of modulated symbols in the unlicensed frequency spectrum.

XX4. The method of any of embodiments 1-XX3, further comprising receiving the block of modulated symbols, as punctured by the puncturing pattern, within unlicensed frequency spectrum.

XX5. The method of any of embodiments 1-XX4, wherein the block of modulated symbols conveys a medium access control, MAC, protocol data unit, PDU.

XX6. The method of embodiment XX5, wherein a MAC subheader for a MAC service data unit, SDU, is at a beginning of the MAC PDU.

XX7. The method of embodiment XX5, wherein MAC control elements, CEs, occur before MAC SDUs in the MAC PDU, such that padding or a MAC SDU is at an end of the MAC PDU.

XX8. The method of any of embodiments XX5-XX7, wherein the MAC PDU includes a high priority MAC CE.

XX9. The method of any of embodiments XX5-XX7, wherein the MAC PDU conveys a buffer status report, BSR, or a power headroom report, PHR.

XX10. The method of any of embodiments 1-XX9, wherein the wireless communication system is a New Radio Unlicensed, NR-U, system.

XX11. The method of any of embodiments 1-10, wherein the transmitter is a wireless device and the receiver is a radio network node.

XX12. The method of embodiment 1, wherein the transport blocks are transmitted on a Physical Uplink Shared Channel, PUSCH.

XX13. The method of any of embodiments 1-10, wherein the transmitter is a radio network node and the receiver is a wireless device.

XX14. The method of any of embodiments 1-13, wherein the link is or corresponds to a single cell, carrier, beam, bandwidth part, channel or sub-band.

GROUP Y EMBODIMENTS

Y1. A method performed by a transmitter configured for use in a wireless communication system, the method comprising:
   duplicating control information to obtain duplicates of the control information;
   time-multiplexing the duplicates of the control information to be transmitted in different respective transmission opportunities on a link to a receiver; and
   for each of the duplicates of the control information, transmitting or not transmitting the duplicate in at least a part of a respective transmission opportunity on the link, depending on whether or not a channel sensing procedure indicates the unlicensed frequency spectrum is clear during that at least part of the transmission opportunity.

Y2. The method of embodiment Y1, further comprising determining whether one or more conditions are met for duplicating the control information, and wherein said duplicating comprises selectively duplicating the control information depending on whether or not the one or more conditions are met.

Y3. The method of embodiment Y2, wherein the one or more conditions include the control information conveying control information for, or originating from, a certain service, a certain type of service, or a service requiring at least a certain latency requirement.

Y4. The method of any of embodiments Y2-Y3, wherein the one or more conditions include a metric exceeding a threshold, wherein the metric indicates or depends on a load or occupancy of the link.

Y5. The method of any of embodiments Y2-Y4, wherein the one or more conditions include a channel sensing failure metric exceeding a failure threshold, wherein the channel sensing failure metric indicates or depends on a number of times the channel sensing procedure has failed on the link within a defined time duration.

Y6. The method of any of embodiments Y1-Y5 wherein said transmitting or not transmitting comprises, for duplicate, transmitting or not transmitting the duplicate also depending on whether or not a duplicate for the control information has already been previously transmitted.

Y7. The method any of embodiments Y1-Y6, further comprising receiving from the receiver control signaling indicating whether the transmitter is or is not to duplicate the control information, and wherein said duplicating comprises selectively duplicating the control information depending on whether the control signaling indicates the transmitter is or is not to duplicate the control information.

Y8. The method any of embodiments Y1-Y7, further comprising:
   receiving from the receiver control signaling indicating a minimum time interval required between transmission opportunities conveying duplicates of the same control information; and
   configuring timing-multiplexing of the duplicates according to the received control signaling.

Y9. The method of any of embodiments Y1-Y8, further comprising receiving from the receiver control signaling indicating a number of duplicates of the control information, and wherein said duplicating comprises duplicating the control information to obtain the number of duplicates indicated by the received control signaling.
Y10. A method performed by a transmitter configured for use in a wireless communication system, the method comprising:
receiving, from a receiver, control signaling indicating one or more of:
whether the transmitter is or is not to duplicate control information (to be conveyed within different respective transmission opportunities on a link to the receiver using unlicensed frequency spectrum);
a number of duplicates of control information that the transmitter is to obtain; and
a minimum time interval required between transmission opportunities conveying duplicates of the same control information.
Y11. The method of embodiment Y10, wherein the control signaling indicates whether the transmitter is or is not to duplicate control information.
Y12. The method of embodiment Y11, further comprising selectively duplicating control information depending on whether the control signaling indicates the transmitter is or is not to duplicate the control information.
Y13. The method of any of embodiments Y10-Y12, wherein the control signaling indicates the number of duplicates of control information that the transmitter is to obtain.
Y14. The method of embodiment Y13, further comprising duplicating control information to obtain the number of duplicates indicated by the received control signaling.
Y15. The method of any of embodiments Y10-Y14, wherein the control signaling indicates the minimum time interval.
Y16. The method of embodiment Y15, further comprising time-multiplexing duplicates of the control information according to the received control signaling.
Y17. The method of any of embodiments Y7-Y16, wherein the control signaling comprises a physical downlink control channel order, a medium access control (MAC) control element, downlink control channel information, system information, or radio resource control signaling.
Y18. The method of any of embodiments Y1-Y17, wherein the wireless communication system is a New Radio Unlicensed, NR-U, system.
Y19. The method of any of embodiments Y1-Y18, wherein the transmitter is a wireless device and the receiver is a radio network node.
Y20. The method of embodiment Y19, wherein the control information is transmitted on a Physical Uplink Shared Channel, PUSCH.
Y21. The method of any of embodiments Y2-Y18, wherein the transmitter is a radio network node and the receiver is a wireless device.
Y22. The method of any of embodiments Y1-Y21, wherein the link is or corresponds to a single cell, carrier, beam, bandwidth part, channel or sub-band.

GROUP Z EMBODIMENTS

Z1. A method performed by a receiver configured for use in a wireless communication system, the method comprising:
transmitting, from the receiver to a transmitter, control signaling indicating one or more of:
whether the transmitter is or is not to duplicate data packets at a higher layer (to be conveyed by different transport blocks within different respective transmission opportunities on a link to the receiver using unlicensed frequency spectrum);
a number of duplicates of each data packet that the higher layer at the transmitter is to obtain; and
a minimum time interval required between transmission of transport blocks conveying duplicates of the same data packet.
Z2. The method of embodiment Z1, wherein the control signaling indicates whether the transmitter is or is not to duplicate control information.
Z3. The method of any of embodiments Z1-Z2, wherein the control signaling indicates the number of duplicates of control information that the transmitter is to obtain.
Z4. The method of any of embodiments Z1-Z3, wherein the control signaling indicates the minimum time interval.
Z5. The method of any of embodiments Z1-Z4, further comprising:
determining a load or occupancy metric that indicates or depends on a load or occupancy of the link; and
generating the control signaling based on the load or occupancy metric.
Z6. The method of embodiment Z5, wherein generating the control signaling comprises generating the control signaling to indicate the transmitter is to duplicate control information based on the load or occupancy metric exceeding a threshold.
Z7. The method of any of embodiments Z1-Z6, wherein the control signaling comprises a physical downlink control channel order, a medium access control (MAC) control element, downlink control channel information, system information, or radio resource control signaling.
Z8. The method of any of embodiments Z1-Z7, wherein the wireless communication system is a New Radio Unlicensed, NR-U, system.
Z9. The method of any of embodiments Z1-Z8, wherein the transmitter is a wireless device and the receiver is a radio network node.
Z10. The method of any of embodiments Z1-Z8, wherein the transmitter is a radio network node and the receiver is a wireless device.
Z11. The method of any of embodiments Z1-Z10, wherein the link is or corresponds to a single cell, carrier, beam, bandwidth part, channel or sub-band.
Z12. The method of any of embodiments Z1-Z11, wherein the control signaling is specific for control information for, or originating from, a certain service, a certain type of service, or a service requiring at least a certain latency requirement.

GROUP H EMBODIMENTS

H1. A method performed by a receiver configured for use in a wireless communication system, the method comprising:
transmitting, from the receiver to a transmitter, dynamic control signaling indicating a number of repetitions of a transport block, if any, that the transmitter is to transmit in consecutive transmission opportunities.

H2. The method of embodiment H2, wherein the dynamic control signaling comprises downlink control information, DCI.

H3. The method of any of embodiments H1-H2, further comprising receiving the repetitions of the transport block on a link in unlicensed frequency spectrum.

H4. The method of any of embodiments H1-H3, wherein the wireless communication system is a New Radio Unlicensed, NR-U, system.

H5. The method of any of embodiments H1-H5, wherein the transmitter is a wireless device and the receiver is a radio network node.

H6. The method of embodiment H5, wherein the repetitions of the transport block are to be transmitted on a Physical Uplink Shared Channel, PUSCH.

H7. The method of any of embodiments H1-H6, further comprising
  determining a load or occupancy metric that indicates or depends on a load or occupancy of a link between the transmitter and the receiver; and
  generating the dynamic control signaling based on the load or occupancy metric.

H8. The method of embodiment H7, wherein generating the dynamic control signaling comprises generating the dynamic control signaling such that a greater number of repetitions are transmitted as the load or occupancy metric increases.

H9. A method performed by a receiver configured for use in a wireless communication system, the method comprising:
  determining a load or occupancy metric that indicates or depends on a load or occupancy of a link between the transmitter and the receiver;
  generating, based on the load or occupancy metric, control signaling indicating a number of repetitions of a transport block, if any, that a transmitter is to transmit in consecutive transmission opportunities; and
  transmitting the control signaling from the receiver to the transmitter.

H10. The method of embodiment H9, wherein generating the control signaling comprises generating the control signaling such that a greater number of repetitions are transmitted as the load or occupancy metric increases.

H11. The method of any of embodiments H9-H10, wherein the control signaling comprises downlink control information, DCI.

H12. The method of any of embodiments H9-H10, wherein the control signaling comprises radio resource control, RRC, signaling.

H13. The method of any of embodiments H9-H12, further comprising receiving the repetitions of the transport block on a link in unlicensed frequency spectrum.

H14. The method of any of embodiments H9-H13, wherein the wireless communication system is a New Radio Unlicensed, NR-U, system.

H15. The method of any of embodiments H9-H14, wherein the transmitter is a wireless device and the receiver is a radio network node.

H16. The method of embodiment H15, wherein the repetitions of the transport block are to be transmitted on a Physical Uplink Shared Channel, PUSCH.

Group J Embodiments

J1. A method performed by a transmitter configured for use in a wireless communication system, the method comprising:
  receiving, from a receiver, dynamic control signaling indicating a number of repetitions of a transport block, if any, that the transmitter is to transmit in consecutive transmission opportunities to the receiver.

J2. The method of embodiment J2, wherein the dynamic control signaling comprises downlink control information, DCI.

J3. The method of any of embodiments J1-J2, further comprising transmitting the repetitions of the transport block on a link in unlicensed frequency spectrum.

J4. The method of any of embodiments J1-J3, wherein the wireless communication system is a New Radio Unlicensed, NR-U, system.

J5. The method of any of embodiments J1-J5, wherein the transmitter is a wireless device and the receiver is a radio network node.

J6. The method of embodiment J5, wherein the repetitions of the transport block are to be transmitted on a Physical Uplink Shared Channel, PUSCH.

GROUP C EMBODIMENTS

C1. A transmitter configured to perform any of the steps of any of the Group A, X, Y, and J embodiments.

C2. A transmitter comprising processing circuitry configured to perform any of the steps of any of the Group A, X, Y, and J embodiments.

C3. A transmitter comprising:
  communication circuitry; and
  processing circuitry configured to perform any of the steps of any of the Group A, X, Y, and J embodiments.

C4. A transmitter comprising:
  processing circuitry configured to perform any of the steps of any of the Group A, X, Y, and J embodiments; and
  power supply circuitry configured to supply power to the transmitter.

C5. A transmitter comprising:
  processing circuitry and memory, the memory containing instructions executable by the processing circuitry whereby the transmitter is configured to perform any of the steps of any of the Group A, X, Y, and J embodiments.

C6. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A, B, X, Y, Z, H, and J embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C7. A computer program comprising instructions which, when executed by at least one processor of a transmitter, causes the transmitter to carry out the steps of any of the Group A, X, Y, and J embodiments.

C8. A carrier containing the computer program of embodiment C7, wherein the carrier is one of an electronic signal, optical signal, radio signal, or computer readable storage medium.

C9. A receiver configured to perform any of the steps of any of the Group B, H, 1, and Z embodiments.

C10. A receiver comprising processing circuitry configured to perform any of the steps of any of the Group B, H, 1, and Z embodiments.

C11. A receiver comprising:
communication circuitry; and
processing circuitry configured to perform any of the steps of any of the Group B, H, 1, and Z embodiments.

C12. A receiver comprising:
processing circuitry configured to perform any of the steps of any of the Group B, H, 1, and Z embodiments;
power supply circuitry configured to supply power to the receiver.

C13. A receiver comprising:
processing circuitry and memory, the memory containing instructions executable by the processing circuitry whereby the receiver is configured to perform any of the steps of any of the Group B, H, 1, and Z embodiments.

C14. The receiver of any of embodiments C9-C13, wherein the receiver is a base station.

C15. A computer program comprising instructions which, when executed by at least one processor of a receiver, causes the receiver to carry out the steps of any of the Group B, H, 1, and Z embodiments.

C16. The computer program of embodiment C14, wherein the receiver is a base station.

C17. A carrier containing the computer program of any of embodiments C15-C16, wherein the carrier is one of an electronic signal, optical signal, radio signal, or computer readable storage medium.

C18. The transmitter of any of embodiments C1-C5, wherein the transmitter is a wireless device.

C19. The computer program of embodiment C7, wherein the transmitter is a wireless device.

C20. The receiver of any of embodiments C9-C14, wherein the receiver is a radio network node.

GROUP D EMBODIMENTS

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B, H, 1, and Z embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B, H, 1, and Z embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A, X, Y, and J embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A, X, Y, and J embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station,
wherein the UE comprises a radio interface and processing circuitry, the UE's processing circuitry configured to perform any of the steps of any of the Group A, X, Y, and J embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A, X, Y, and J embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B, H, 1, and Z embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A, X, Y, and J embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a transmitter configured for use in a wireless communication system, the method comprising:
obtaining data packets at a higher layer of a protocol stack implemented by the transmitter;
duplicating each data packet at the higher layer to obtain duplicates of each data packet;
transmitting the duplicates of each data packet on different respective channels from the higher layer to a lower layer of the protocol stack;
generating different transport blocks to include data from the different respective channels, such that the duplicates of each data packet are conveyed by different transport blocks; and
for each transport block, transmitting or not transmitting at least a part of the transport block within at least a part of a different respective transmission opportunity on a link to a receiver using unlicensed frequency spectrum, depending on whether or not a channel sensing procedure indicates the unlicensed frequency spectrum is clear during that at least part of the transmission opportunity;
wherein the transmitter or the receiver is a user equipment (UE);
wherein the link is or corresponds to a single bandwidth part, channel, or sub-band where the UE has only one single connection to the wireless communication system available.

2. The method of claim 1, further comprising determining whether one or more conditions are met for duplicating the data packets at the higher layer, and wherein said duplicating comprises selectively duplicating the data packets at the higher layer depending on whether or not the one or more conditions are met.

3. The method of claim 2, wherein the one or more conditions include the data packets conveying data for, or originating from, a certain service, a certain type of service, or a service requiring at least a certain latency requirement.

4. The method of claim 2, wherein the one or more conditions include a metric exceeding a threshold, wherein the metric indicates or depends on a load or occupancy of the link.

5. The method of claim 2, wherein the one or more conditions include a channel sensing failure metric exceeding a failure threshold, wherein the channel sensing failure metric indicates or depends on a number of times the channel sensing procedure has failed on the link within a defined time duration.

6. The method of claim 1, wherein said transmitting or not transmitting comprises, for each transport block, transmitting or not transmitting at least a part of the transport block also depending on whether or not a previously transmitted transport block has already conveyed a duplicate of the same data packet as that conveyed by the transport block.

7. The method of claim 1, further comprising receiving from the receiver control signaling indicating whether the transmitter is or is not to duplicate the data packets at the higher layer, and wherein said duplicating comprises selectively duplicating the data packets at the higher layer depending on whether the control signaling indicates the transmitter is or is not to duplicate the data packets.

8. The method of claim 1, further comprising:
receiving from the receiver control signaling indicating a minimum time interval required between transmission of transport blocks conveying duplicates of the same data packet; and
configuring generation of transport blocks and/or timing with which transport blocks are transmitted according to the received control signaling.

9. The method of claim 1, further comprising receiving from the receiver control signaling indicating a number of duplicates of each data packet that the higher layer at the transmitter is to obtain, and wherein said duplicating comprises duplicating each data packet at the higher layer to obtain the number of duplicates each data packet indicated by the received control signaling.

10. The method of claim 1, wherein the data packets are packet data convergence protocol (PDCP) packets, wherein the higher layer is a PDCP layer, wherein the lower layer is a radio link control (RLC) layer, wherein the channels are logical channels, and wherein the transport blocks correspond to medium access control (MAC) protocol data units (PDUs).

11. The method of claim 1, wherein the wireless communication system is a New Radio Unlicensed (NR-U) system.

12. A method performed by a receiver configured for use in a wireless communication system, the method comprising:
transmitting, from the receiver to a transmitter, control signaling indicating one or more of:
whether the transmitter is or is not to duplicate data packets at a higher layer to be conveyed by different transport blocks within different respective transmission opportunities on a link to the receiver using unlicensed frequency spectrum;
a number of duplicates of each data packet that the higher layer at the transmitter is to obtain; and
a minimum time interval required between transmission of transport blocks conveying duplicates of the same data packet;
wherein the transmitter or the receiver is a user equipment UE);
wherein the link is or corresponds to a single bandwidth part, channel, or sub-band where the UE has only one single connection to the wireless communication system available.

13. The method of claim 12, further comprising:
determining a load or occupancy metric that indicates or depends on a load or occupancy of the link; and
generating the control signaling to indicate the transmitter is to duplicate data packets based on the load or occupancy metric exceeding a threshold.

14. The method of claim 12, wherein the data packets are packet data convergence protocol (PDCP) packets, wherein the higher layer is a PDCP layer, and wherein the transport blocks correspond to medium access control (MAC) protocol data units (PDUs).

15. The method of claim 12, wherein the wireless communication system is a New Radio Unlicensed (NR-U) system.

16. The method of claim 12, further comprising:
determining a channel sensing failure metric that indicates or depends on a number of times a channel sensing procedure has failed on the link within a defined time duration; and
generating the control signaling to indicate the transmitter is to duplicate data packets based on the channel sensing failure metric exceeding a failure threshold.

17. A transmitter configured for use in a wireless communication system, the transmitter comprising:
communication circuitry; and
processing circuitry configured to:
obtain data packets at a higher layer of a protocol stack implemented by the transmitter;
duplicate each data packet at the higher layer to obtain duplicates of each data packet;
transmit the duplicates of each data packet on different respective channels from the higher layer to a lower layer of the protocol stack;
generate different transport blocks to include data from the different respective channels, such that the duplicates of each data packet are conveyed by different transport blocks; and
for each transport block, transmit or not transmit at least a part of the transport block within at least a part of a different respective transmission opportunity on a link to a receiver using unlicensed frequency spectrum, depending on whether or not a channel sensing procedure indicates the unlicensed frequency spectrum is clear during that at least part of the transmission opportunity;
wherein the transmitter or the receiver is a user equipment (UE);
wherein the link is or corresponds to a single bandwidth part, channel, or sub-band where the UE has only one single connection to the wireless communication system available.

18. A receiver configured for use in a wireless communication system, the receiver comprising:
communication circuitry; and
processing circuitry configured to transmit, from the receiver to a transmitter, control signaling indicating one or more of:
whether the transmitter is or is not to duplicate data packets at a higher layer to be conveyed by different transport blocks within different respective transmission opportunities on a link to the receiver using unlicensed frequency spectrum;
a number of duplicates of each data packet that the higher layer at the transmitter is to obtain; and
a minimum time interval required between transmission of transport blocks conveying duplicates of the same data packet;

wherein the link is or corresponds to a single bandwidth part, channel, or sub-band where the UE has only one single connection to the wireless communication system available.

* * * * *